United States Patent [19]
Guinand et al.

[11] Patent Number: 5,265,090
[45] Date of Patent: Nov. 23, 1993

[54] SWITCHING ELEMENT FOR CROSS-CONNECT EQUIPMENT FOR DIGITAL BIT STREAMS MULTIPLEXED BY TIME-DIVISION MULTIPLEXING DIGITAL TRIBUTARIES WITH DIFFERENT BIT RATES

[75] Inventors: Jacques Guinand, Saint Remy Les Chevreuse; Jean-Loup Ferrant, Boulogne Billancourt; Jean-Claude Faye, Gif Sur Yvette; Hervé Roux, Massy, all of France

[73] Assignee: Alcatel Cit, Paris, France

[21] Appl. No.: 669,694

[22] Filed: Mar. 14, 1991

[30] Foreign Application Priority Data

Mar. 19, 1990 [FR] France ................ 90 03465

[51] Int. Cl.⁵ .................. H04J 14/08; H04J 3/06
[52] U.S. Cl. ........................ 370/58.1; 370/84; 370/102; 370/112
[58] Field of Search .............. 370/53, 58.1, 58.2, 370/58.3, 60, 79, 82, 84, 99, 100.1, 102, 105.1, 110.1, 112; 340/825.85, 825.89; 379/291, 333, 334, 335

[56] References Cited

U.S. PATENT DOCUMENTS

| | | | |
|---|---|---|---|
| 4,967,405 | 10/1990 | Upp et al. | 370/58.1 |
| 5,040,170 | 8/1991 | Upp et al. | 370/99 |
| 5,091,907 | 2/1992 | Wettengel | 370/84 |
| 5,123,010 | 6/1992 | Pospischil | 370/58.1 |
| 5,142,529 | 8/1992 | Parruck et al. | 370/84 |

Primary Examiner—Douglas W. Olms
Assistant Examiner—Alpus H. Hsu
Attorney, Agent, or Firm—Sughrue, Mion, Zinn, Macpeak & Seas

[57] ABSTRACT

A switching element for cross-connect equipment for digital bit streams multiplexed by time-division multiplexing of digital bit streams at different bit rates includes, for each incoming frame transmission medium, a device for extracting from said incoming frames signals constituting multiplexing units to be cross-connected. It further includes for each incoming frame transmission medium a memory for signals constituting multiplexing units to be cross-connected adapted to hold at least N signals where N denotes the repetition period in the incoming frames of the lowest bit rate tributary of the multiplexing hierarchy. It further includes for each incoming frame transmission medium for a device for writing said memory synchronously with the extraction of said signals, at different addresses for signals constituting different multiplexing units to be cross-connected and at the same addresses for signals constituting the same multiplexing unit to be cross-connected, the frequency at which each address is rewritten being related to the repetition period in the incoming frames of the signals written at said address. It finally includes for each incoming frame transmission medium a device for reading said memory synchronously with the insertion into the outgoing frames of signals constituting multiplexing units to be cross-connected at addresses determined by said distribution law.

8 Claims, 21 Drawing Sheets

FIG.23
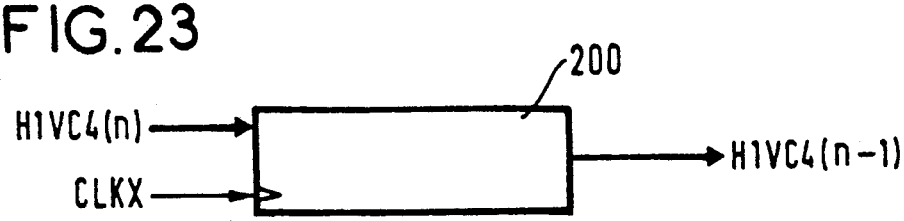
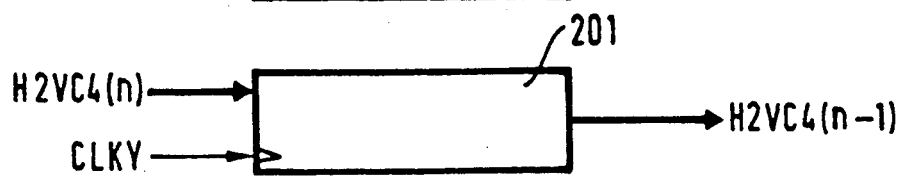
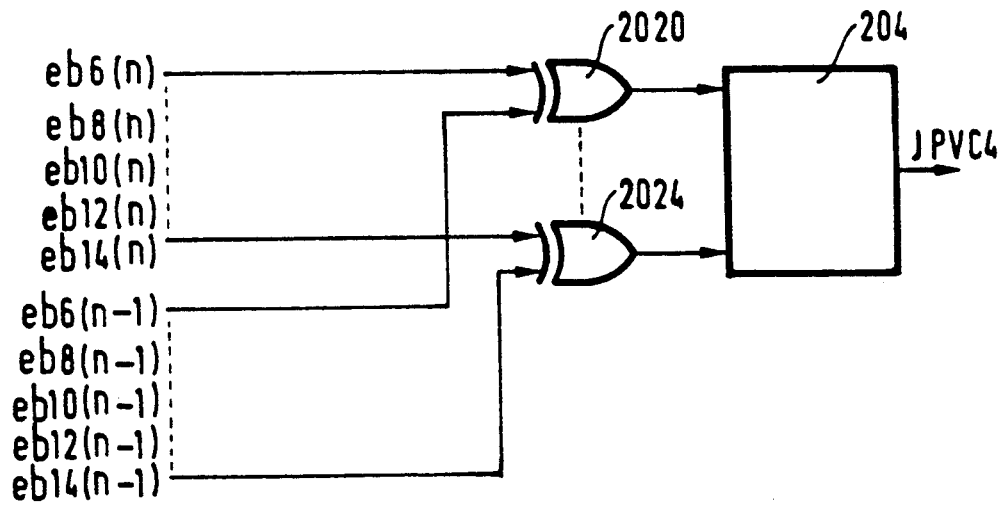
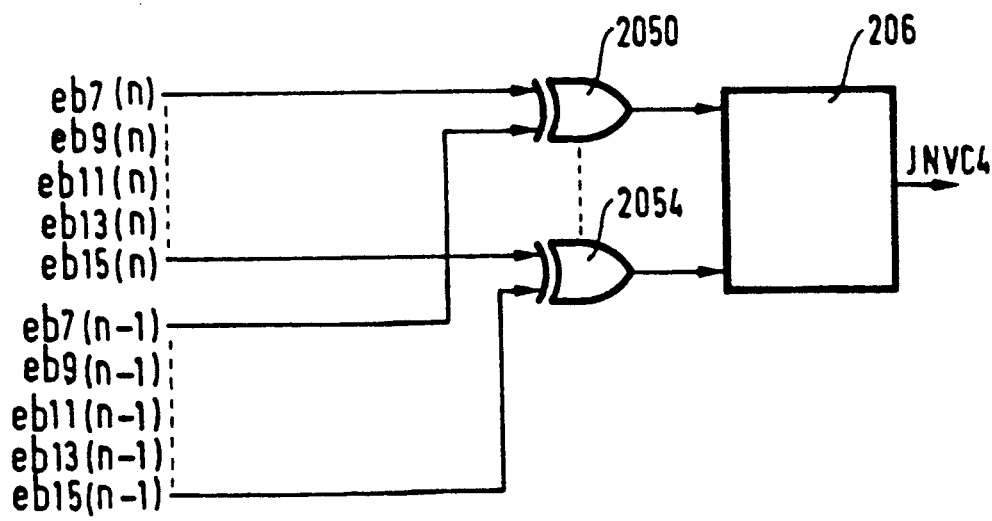
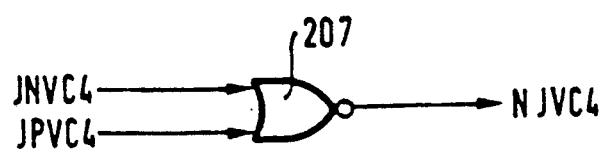

FIG.28
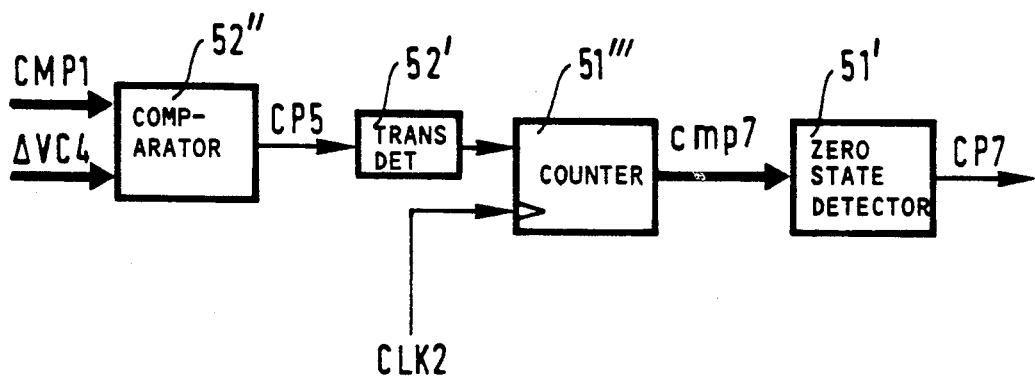
FIG.29
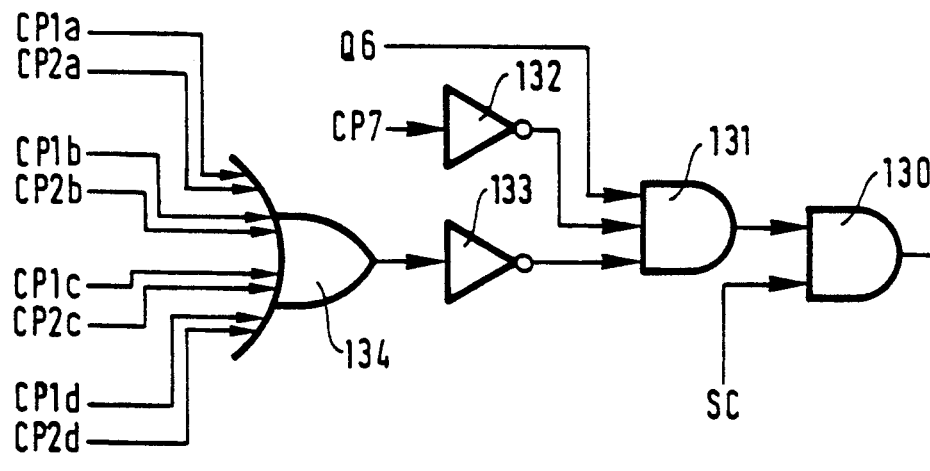
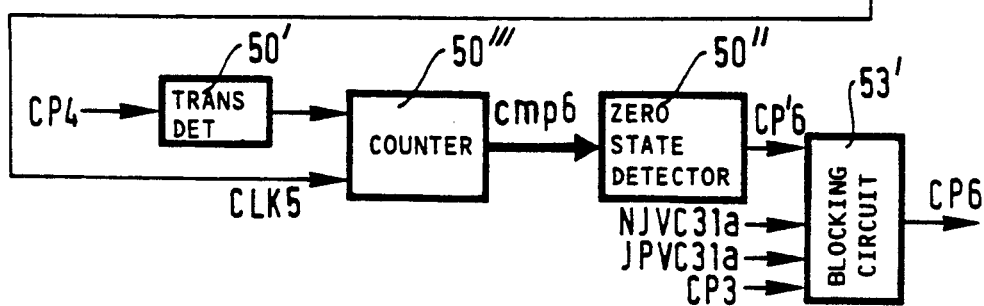

SWITCHING ELEMENT FOR CROSS-CONNECT EQUIPMENT FOR DIGITAL BIT STREAMS MULTIPLEXED BY TIME-DIVISION MULTIPLEXING DIGITAL TRIBUTARIES WITH DIFFERENT BIT RATES

BACKGROUND OF THE INVENTION

1. Field of the invention

The present invention concerns digital transmission systems in which the multiplexed digital bit streams transmitted are obtained by time-division multiplexing of digital tributaries at different bit rates according to a synchronous multiplexing hierarchy.

2. Description of the prior art

The present invention is more particularly concerned with cross-connect equipment for telecommunication systems of this kind adapted to distribute incoming frame tributaries carried by a plurality of incoming transmission media to outgoing frames carried by a plurality of outgoing transmission media, in accordance with a particular law.

A hierarchy for time-division multiplexing of digital tributaries at different bit rates is defined in CCITT Recommendations G.707, G.708 and G.709. The principle of this kind of multiplexing hierarchy is outlined in FIG. 1. The bit rates that can be multiplexed using this hierarchy are the bit rates standardized by the CCITT and shown in the righthand part of the figure: 2 048 kbit/s, 8 448 kbit/s, 34 368 kbit/s, 1 544 kbit/s, 6 312 kbit/s, 44 736 kbit/s, and 139 264 kbit/s.

There are various possible multiplexing structures for this multiplexing hierarchy depending on the bit rate of the tributaries to be multiplexed for a given application, and each multiplexing structure, such as that shown in bold line in the figure, corresponding to tributaries to be multiplexed with bit rates of 1 554 kbit/s, 2 048 kbit/s, 8 448 kbit/s and 34 368 kbit/s, comprises a number of hierarchy levels designated N1, N2, N3 in the example in question, going from the righthand part of the figure towards the lefthand part, i.e. in the direction in which the frames are formed from the various tributaries.

Tributaries can be introduced at the various hierarchy levels of a multiplexing structure and comprise entities referred to hereinafter as containers and entities referred to hereinafter as multiplexing units.

In what follows the terms container and multiplexing unit are used generically for sequences of entities and for individual elements within the sequences.

The multiplexing units constituted at a given hierarchy level and designated TU or AU (TU11, TU12, TU22 for level N1, TU31 for level N2 and AU4 for level N3 in this example) are formed by adding to the containers constituted at the same hierarchy level signals for indexing and justifying these containers relative to these multiplexing units.

The containers constituted at a given hierarchy level and designated VC (VC11, VC12, VC22 for level N1, VC31 for level N2 and VC34 for level N3 in this example) are formed by adding service signals, either to multiplex signals resulting from the multiplexing of "n" multiplexing units constituted at a lower hierarchy level, or to so-called information signals sampled on a tributary introduced at the level in question, designated C (C11, C12, C22 for level N1 and C31 for level N2 in this example).

FIG. 2 is a schematic showing the formation of the various containers or multiplexing units in the case of the multiplexing structure taken previously as an example. A container VC4 constituted at level N3 is obtained by multiplexing signals from four multiplexing units TU31a, TU31b, TU31c, TU31d constituted at level N2.

Two of these multiplexing units (TU31a and TU31b) are formed from containers VC31a and VC31b in turn formed from 34 358 kbit/s tributaries C31a and C31b introduced at level N2.

The other two multiplexing units (TU31c and TU31d) are formed from containers VC31c and VC31d in turn formed from multiplexing units TUG22 constituted at level N1 and which merely multiplex multiplexing units already constituted at the same hierarchy level, without adding indexing and justification signals.

The container VC31c is formed from four multiplexing units TUG22a, TUG22b, TUG22c, TUG22d in turn formed from four multiplexing units TU22a, TU22b, TU22c, TU22d, in turn formed from four containers VC22a, VC22b, VC22c, VC22d in turn formed from four 8 448 kbit/s tributaries C22a, C22b, C22c, C22d.

The container VC31d is formed by multiplexing four multiplexing units TUG22e, TUG22f, TUG22g, TUG22h of which the first two (TUG22e and TUG22f) are formed like the multiplexing units TUG22a, TUG22b, TUG22c, TUG22d from 8 448 kbit/s tributaries C22e and C22f.

The third multiplexing unit TUG22g is formed from five multiplexing units TU11a, TU11b, TU11c, TU11d, TU11e respectively formed from containers VC11a, VC11b, VC11c, VC11d, VC11e ; in turn formed from five respective 1 544 kbit/s tributaries C11a, C11b, C11c, C11d, C11e.

The fourth multiplexing unit TUG22h is formed from four multiplexing units TU12a, TU12b, TU12c, TU12d respectively formed from containers VC12a, VC12b, VC12c, VC12d in turn formed from respective 2 048 kbit/s tributaries C12a, C12b, C12c, C12d.

The multiplexing unit constituted at the highest hierarchy level, which is the multiplexing unit AU4 in this example, is obtained by adding justification and indexing signals to the container constituted at this level, which is the container VC4 in this example.

The resulting STM frames are obtained by adding service signals to the multiplexing units constituted at the highest hierarchy level.

The diversity of the bit rates of the tributaries which form the frames resulting from such synchronous hierarchical multiplexing is reflected in the fact that the tributaries have within the resulting frames different information signal repetition periods, each of these periods being inversely proportional to the bit rate of the tributary. This repetition period is obtained by forming the product of the multiplexing factors "n" encountered all along the multiplexing structure for the tributary concerned. To give an example, the repetition period for the 2 048 kbit/s tributaries C12 is 64, that for the 1 544 kbit/s tributaries C11 is 80, that for the 8 448 kbit/s tributaries C22 is 16, and that for the 34 368 kbit/s tributaries C31 is 4.

The justification signals added to containers at a given hierarchy level to constitute multiplexing units provide for adapting the timing of the signals forming the containers to the timing of a local clock used at this hierarchy level, using the known positive-negative justification technique whereby a signal of a container is periodically substituted for a stuff signal provided for this purpose in the multiplexing unit formed from this container if the former timing is faster than the latter timing and a stuff signal is substituted periodically for a container signal if the former timing is slower than the latter timing.

The indexing signals produced at the various hierarchy levels serve to distribute to containers of lower levels the justification operations applied to containers of higher levels, to allow for the synchronous multiplexing effected at the various levels of the multiplexing hierarchy. In particular, they make it possible to situate each container constituted at a particular hierarchy level relative to the corresponding multiplexing unit constituted at this level, allowing for justification operations applied to this container for a given frame and for earlier frames. Also, they have a specific position within the corresponding multiplexing unit and consequently within the corresponding container constituted at the next higher hierarchy level, which (by successive recourse to the indexing signals produced at the various hierarchy levels encountered on running through the multiplexing structure in the direction opposite the direction in which the frames are formed from the tributaries) makes it possible to identify the container in question within the frames.

The service signals added to the multiplexing units constituted at the highest hierarchy level in order to constitute the frames are located at repetitive positions within these frames, leading to the conventional representation of these frames in the form of tables or matrices having in practise nine lines numbered 0 through 8 and 270 columns numbered 0 through 269, reading from left to right and from top to bottom, that is say, line by line, each intersection between a line and a column representing a signal (a service signal, a justification signal, an indexing signal or an information signal) consisting in practise of one byte.

Multiplexed digital bit stream cross-connect equipment comprises a switching network which takes account of information on the time slots occupied by the tributaries in the frames of the multiplexing hierarchy, the distribution law mentioned above and the incoming frames to build outgoing frames whose tributaries are the tributaries extracted from the incoming frames with the timing with which they arrive in said incoming frames and inserted into the outgoing frames at time slots indicated by the distribution law.

FIG. 3 shows a known architecture of a switching network of this kind, representing a square network. The switching network is formed by switching elements UCij arranged as a matrix with I rows and J columns ($0 \leq  \leq$ I-1 and $0 \leq j \leq$ J-1). The example relates to the case where I = J =3, representing a matrix with three rows and three columns, with 24 incoming media E0 through E23 and 24 outgoing media S0 through S23.

The switching elements have so-called vertical inputs, so-called horizontal inputs and so-called vertical outputs connected in the manner now to be described.

The 24 incoming media are divided between the three rows of the matrix with eight incoming media per row applied to the horizontal inputs of the switching elements of that row.

The 24 outgoing media are divided between the three switching elements of row 2 cf the matrix with eight outgoing media per switching element obtained on the vertical outputs of the switching element.

24 so-called outgoing frame reference media R0 through R23 are applied to the vertical inputs of the three switching elements of row 0, with eight reference media applied to the vertical inputs of each switching element of this row.

The vertical outputs of the switching elements of row 0 are respectively applied to the vertical inputs of the switching elements of row 1 and the vertical outputs of the switching elements of row 1 are respectively applied to the vertical inputs of the switching elements of row 2.

The frames of the various media outgoing from this cross-connect equipment are progressively built through the various columns of the matrix using for each separate time slot of the various reference frames a particular tributary of a particular incoming frame according to the law mentioned above controlling the distribution of the incoming frames to the outgoing frames.

FIG. 4 shows how this is done for a subset of the switching element comprising a single vertical input $E'1$, a single vertical output $S'1$ and K horizontal inputs E0 through EK - 1 (K =8 in this example).

The vertical input in question is applied to a first multiplexer MUX0 to which is also applied from a first memory MEM0 the input E0.

The output of the multiplexer MUX0 is applied to a second multiplexer which receives the input E1 from a memory MEM1, and so on.

The switching function requires the memories MEM0, MEM1, etc to be written beforehand with the signals to be switched by means of the multiplexers MUX0, MUX1, etc, the various memories being written sequentially by the signals to be cross-connected in the order in which these signals are presented on the incoming frames and read out in any order implementing the required distribution law at this switching element. FIG. 4 shows the input to these memories of control signals C from a central control unit (not shown) such as a microprocessor.

In existing cross-connect equipment operating on multiplexed digital bit streams produced by synchronous time-division multiplexing of plesiochronous digital tributaries, that is to say tributaries having the same nominal bit rate, the usual practise is to dimension these memories so that each can contain all of the signals to be cross-connected contained in an incoming frame.

In the present context of synchronous time-division multiplexing of digital bit streams at different bit rates, this solution would result in the cross-connect equipment being much too bulky, given that the number of signals to be stored per frame would be $270 \times 9 = 2\,430$. Each signal comprising one byte, the total number of bits is 19 440.

An object of the present invention is to provide a switching element for cross-connect equipment for multiplexed digital bit streams produced by time-division multiplexing of digital bit streams at different bit rates.

SUMMARY OF THE INVENTION

The present invention consists in a switching element for cross-connect equipment for digital bit streams multiplexed by time-division multiplexing of digital bit streams at different bit rates according to a synchronous multiplexing hierarchy at the various levels of which tributaries can be introduced and constituted by entities called hereinafter multiplexing units, the multiplexing units being formed as appropriate either of multiplex signals obtained by multiplexing lower hierarchy level multiplexing units or signals from tributaries, said switching element being adapted to distribute according to a specific law signals constituting multiplexing units, hereinafter called multiplexing units to be cross-connected, of incoming frames carried by a plurality of incoming transmission media in said switching element to outgoing frames carried by an outgoing transmission medium of said switching element which comprises, for each incoming frame transmission medium:

- means for extracting from said incoming frames signals constituting multiplexing units to be cross-connected,
- a memory for signals constituting multiplexing units to be cross-connected adapted to hold at least N signals where N denotes the repetition period in the incoming frames of the lowest bit rate tributary of the multiplexing hierarchy,
- means for writing said memory synchronously with the extraction of said signals, at different addresses for signals constituting different multiplexing units to be cross-connected and at the same addresses for signals constituting the same multiplexing unit to be cross-connected, the frequency at which each address is rewritten being related to the repetition period in the incoming frames of the signals written at said address,
- means for reading said memory synchronously with the insertion into the outgoing frames of signals constituting multiplexing units to be cross-connected at addresses determined by said distribution law.

Other objects and characteristics of the present invention will emerge more clearly from the following description of one embodiment of the invention given by way of non-limiting example only with reference to the accompanying diagrammatic drawings.

BRIEF DESCRIPTION OF THE DRAWINGS

FIG. 23 shows the circuits which generate the signal JNVC4, JPVC4 and NJVC41;

FIG. 28 shows how the bytes constituting the POHVC4 service signals are detected;

FIG. 29 shows how the subsequent bytes of container VC31a are identified after the first byte has been identified;

DETAILED DESCRIPTION OF THE INVENTION

The expression "multiplexing units to be cross-connected" means multiplexing units built at a given hierarchy level and to which the law governing distribution of incoming frames to outgoing frames applies.

Figure 1:
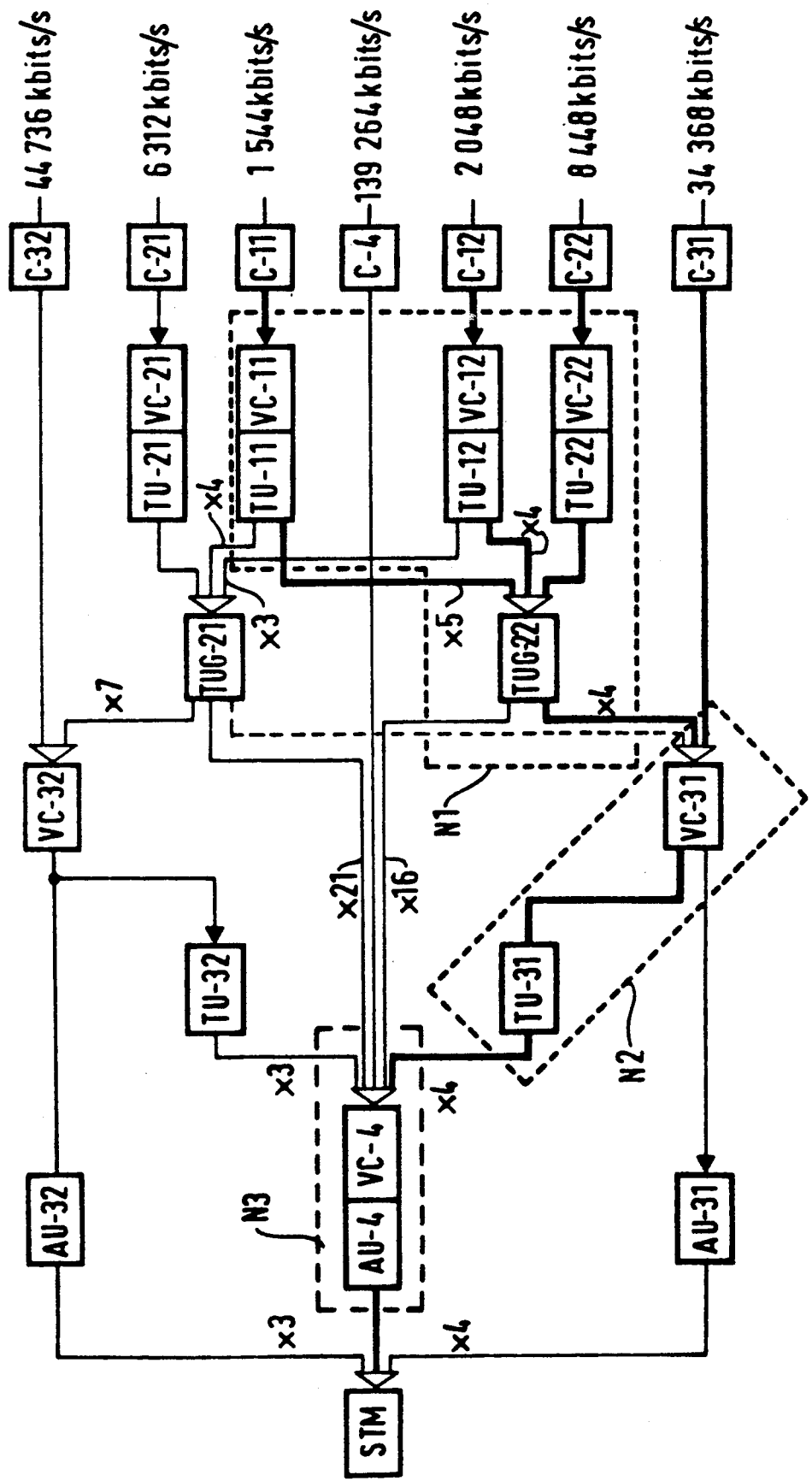
FIG. 1 shows an outline of a hierarchy for time-division multiplexing of digital tributaries at different bit rates.

In the case of the multiplexing hierarchy described in outline above with reference to FIG. 1, the multiplexing units are the entities obtained at a given hierarchy level by adding indexing and justification signals to containers built at this level.

The embodiment of a switching element in accordance with the invention described below relates to the multiplexing structure shown in FIG. 2 and the example covers the case where the multiplexing units to be cross-connected are the multiplexing units TU31a, TU31b, TU22a through TU22f, TU11a through TU11e and TU12a through TU12d.

As mentioned above, the repetition period within the frames of the signals constituting multiplexing units TU31 is 4, that for the multiplexing units TU22 is 16, that for the multiplexing units TU11 is 80 and that for the multiplexing units TU12 is 64.

Each switching element memory for signals constituting multiplexing units to be cross-connected (hereinafter designated cross-connect signal memory for short) is dimensioned for the maximum period that these signals can have. This maximum period is 84 and results (see FIG. 1) in the case of a multiplexing structure entailing multiplexing of four multiplexing units TU11 obtained from 1 544 kbit/s tributaries C11 in a multiplexing unit TUG21 followed by multiplexing of 21 multiplexing units TUG21 to form a container VC4.

Each of the memories so dimensioned is written with signals constituting multiplexing units to be cross-connected extracted from incoming frames applied to the memory.

Figure 5:
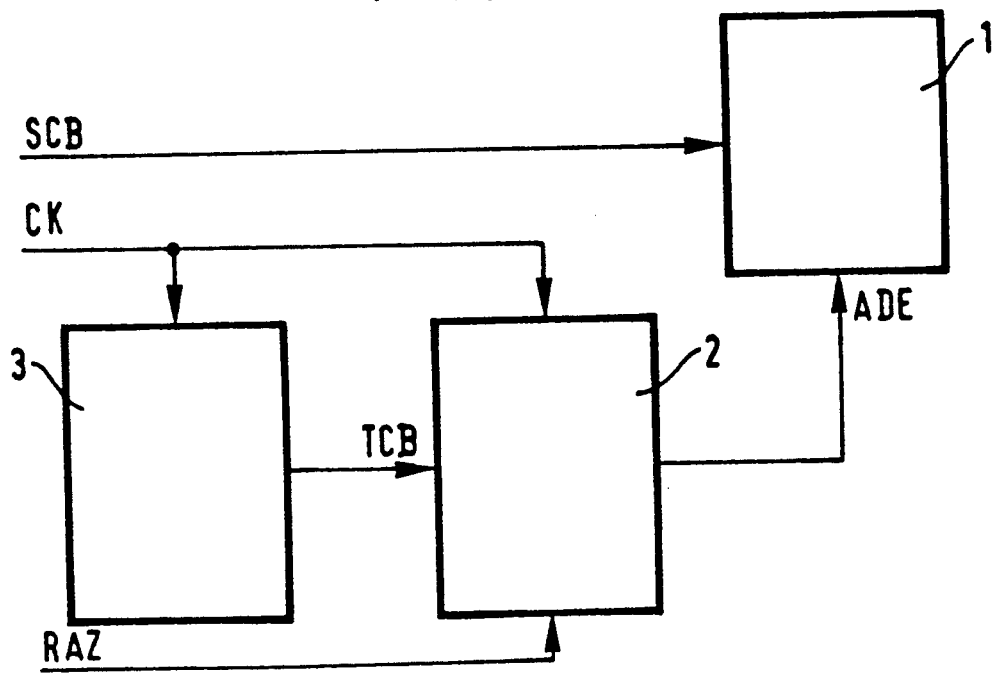
FIG. 5 is a diagram showing write addressing means for a memory for signals constituting multiplexing units to be cross-connected.

FIG. 5 shows this memory 1 receiving the signals SCB constituting multiplexing units to be cross-connected to be stored in the memory. A write address generator 2 supplies write addresses ADE to the memory 1 and receives a clock signal CK which times the extraction of the signals. The operation of the write address generator 2 will now be described with reference to the table in FIG. 6.

The table shows for each multiplexing unit to be cross-connected (in this example: TU31a, TU31b, TU22a through TU22f, TU11a through TU11e or TU12a through TU12d, whose type TCB (TU31, TU22, TU11 or TU12) and period T (4, 16, 18 or 64) are also shown, and which is simply identified by a number from 1 through 17 assigned as in FIG. 2) the address ADE at which to write the signals constituting the multiplexing unit applied in succession to the input of the cross-connect signal memory, for a set of 80 signals extracted consecutively from incoming frames and whose extraction rank "r" (0 through 79) is also shown.

The principle is to write the signals applied to the input of this memory at identical addresses for signals to be cross-connected constituting the same multiplexing unit and to write the signals applied to the input of the memory at different addresses for signals to be cross-connected constituting different multiplexing units.

In this embodiment of the write address generator 2, now to be further described with reference to FIG. 7, the write addresses are assigned in the order in which the signals constituting the multiplexing unit to be cross-connected are extracted, and are therefore obtained by taking the rank "r" of the signal applied to the input of the memory 1 at a given time modulo the period "T" of the multiplexing unit to which this signal belongs.

Figure 7:
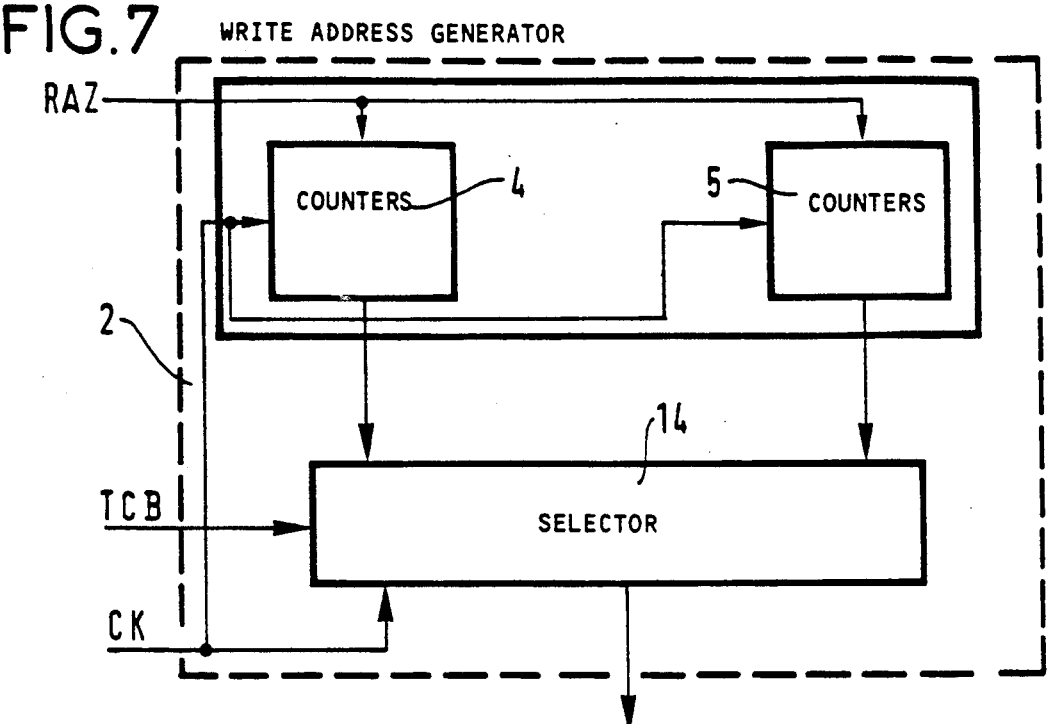
FIG. 7 shows a write-address generator which comprises sets of counters assigned to periods of signals to be cross-connected.

The write address generator shown in FIG. 7 comprises a first set 4 of counters assigned to periods of signals to be cross-connected with values 4, 16, 64 and 80, multiples of a common base period of value 4 representing so-called "ETSI" frames, and a second set 5 of counters assigned to periods of signals to be cross-connected with values 3, 21, 63, 84, multiples of a common base period with a value of 3 representing so-called "US" frames.

Figure 8:
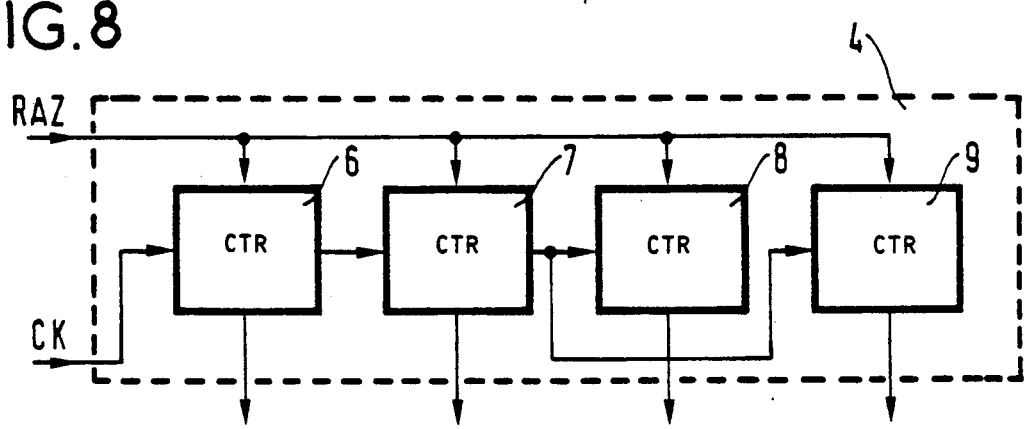
FIG. 8 shows the first set of 4 counters of the write-address generator in FIG. 7.

As shown in FIG. 8, the first set 4 of counters comprises four counters 6, 7, 8 and 9 of which the first three counters 6, 7 and 8 are connected in cascade, the first being clocked by the clock signal CK, the first three counting "modulo 4" and the last counting "modulo 5", the final counter being clocked by the overflow output of the counter 7. The counters are cleared by a reset signal RAZ comprising pulses occurring at specific times relative to the start of each incoming frame, each of which represents a new start point for the rank numbers r. The times at which the counters 6 through 9 are cleared, in other words the times at which the pulses of the reset signal RAZ occur in the case of "ETSI" incoming frames, will be described in more detail later.

Figure 9:
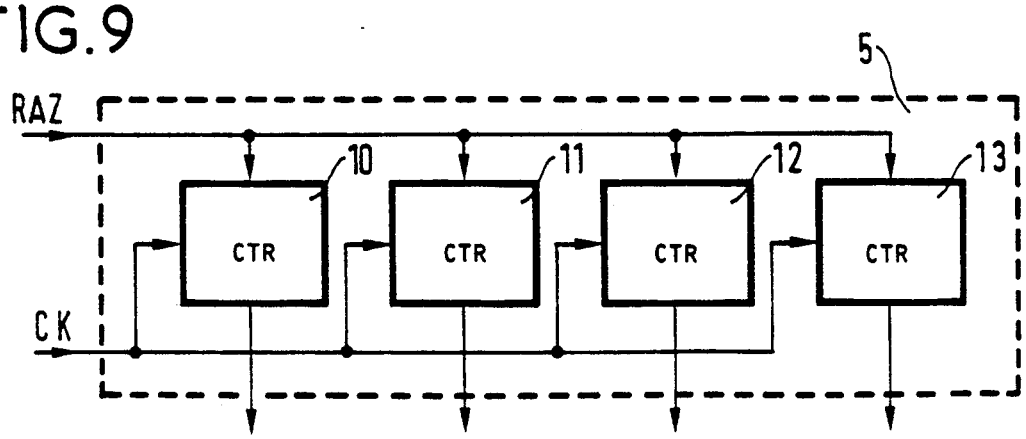
FIG. 9 shows the second set of 5 counters of the write-address generator in FIG. 7.

As shown in FIG. 9, the second set 5 of counters comprises four counters 10, 11, 12 and 13 all clocked by the clock signal CK and cleared by the reset signal RAZ. They respectively count from 0 to 2, from 0 to 20, from 0 to 62 and from 0 to 83. The times at which these counters are cleared, in other words the times at which the pulses of the reset signal RAZ occur in the case of "US" incoming frames, will also be described in more detail later.

Referring again to FIG. 7, the write address generator 2 also includes a selector 14 which selects particular counters or a particular set of counters according to the period of the multiplexing unit in question at the input of the cross-connect signal memory, this period being obtained by reading at the timing rate of the clock CK an incoming frame description memory 3 (FIG. 5) giving the succession of multiplexing units to be cross-connected on the incoming frames and their types.

Figures 10, 11:
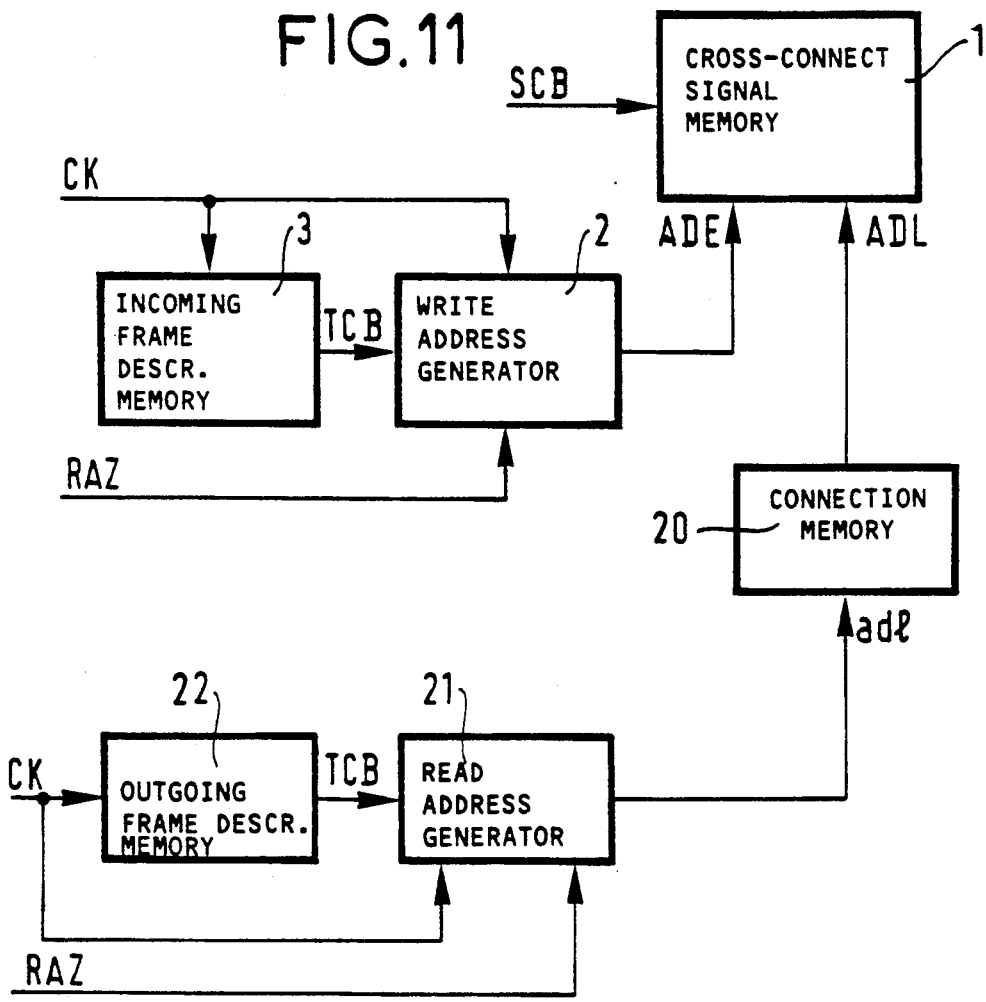
FIG. 10 is a table showing how the write address generator shown in FIGS. 7 through 9 is controlled.
FIG. 11 is a diagram showing a switching element.

FIG. 10 is a table summarizing the counters selected (CS) according to the period T, in the case of an "ETSI" incoming multiplex and of multiplexing units to be cross-connected as discussed heretofore in part I of the table, and in the case of a "US" incoming multiplex and multiplexing units to be cross-connected of type TU32, TU21, TU12 and TU11 in part II of the table.

The incoming frame description memory 3 is read sequentially at the timing rate of the clock CK. It contains in coded form at least one series of periods of sufficient length to characterize, by being repeated, all the signals constituting multiplexing units to be cross-connected of an incoming frame.

In the present example this series is obtained from a basic series of four periods characterizing the multiplexing carried out at the highest hierarchy level N3 (and sufficient to describe the incoming frames if the latter were made up only of C31 tributaries) by repeating the basic series and changing the last two terms as many times as necessary to characterize the multiplexing carried out at the next lower hierarchy level N2. There is then no utility in repeating the same operations at the next lower hierarchy level N1, as this would merely lead to simple repetition of the new series so obtained, given that the various multiplexing operations carries out at level N1 are applied to tributaries with the same bit rate.

Figure 2:
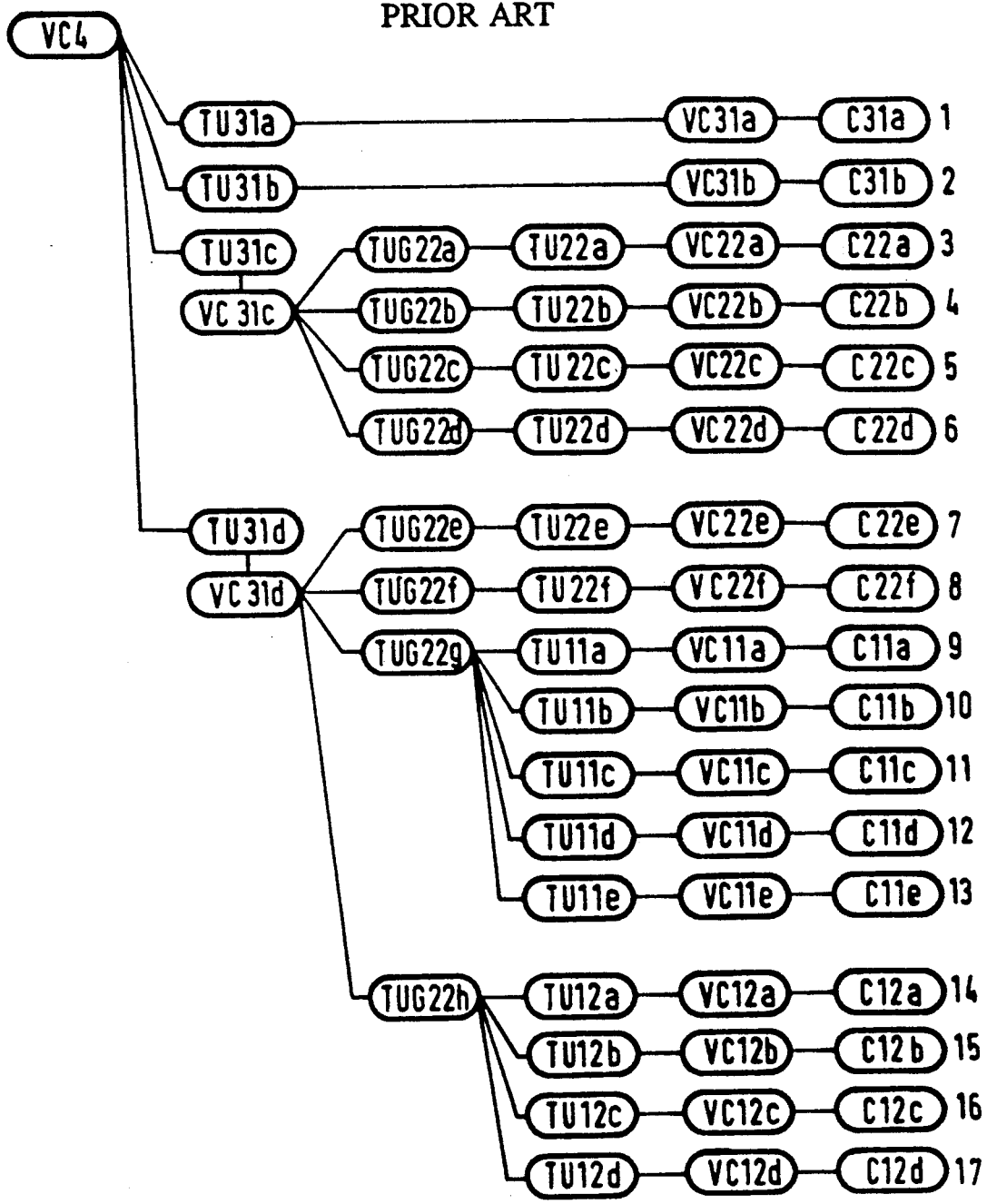
FIG. 2 is a schematic which shows the formation of various containers or multiplexing units.
Figure 3:
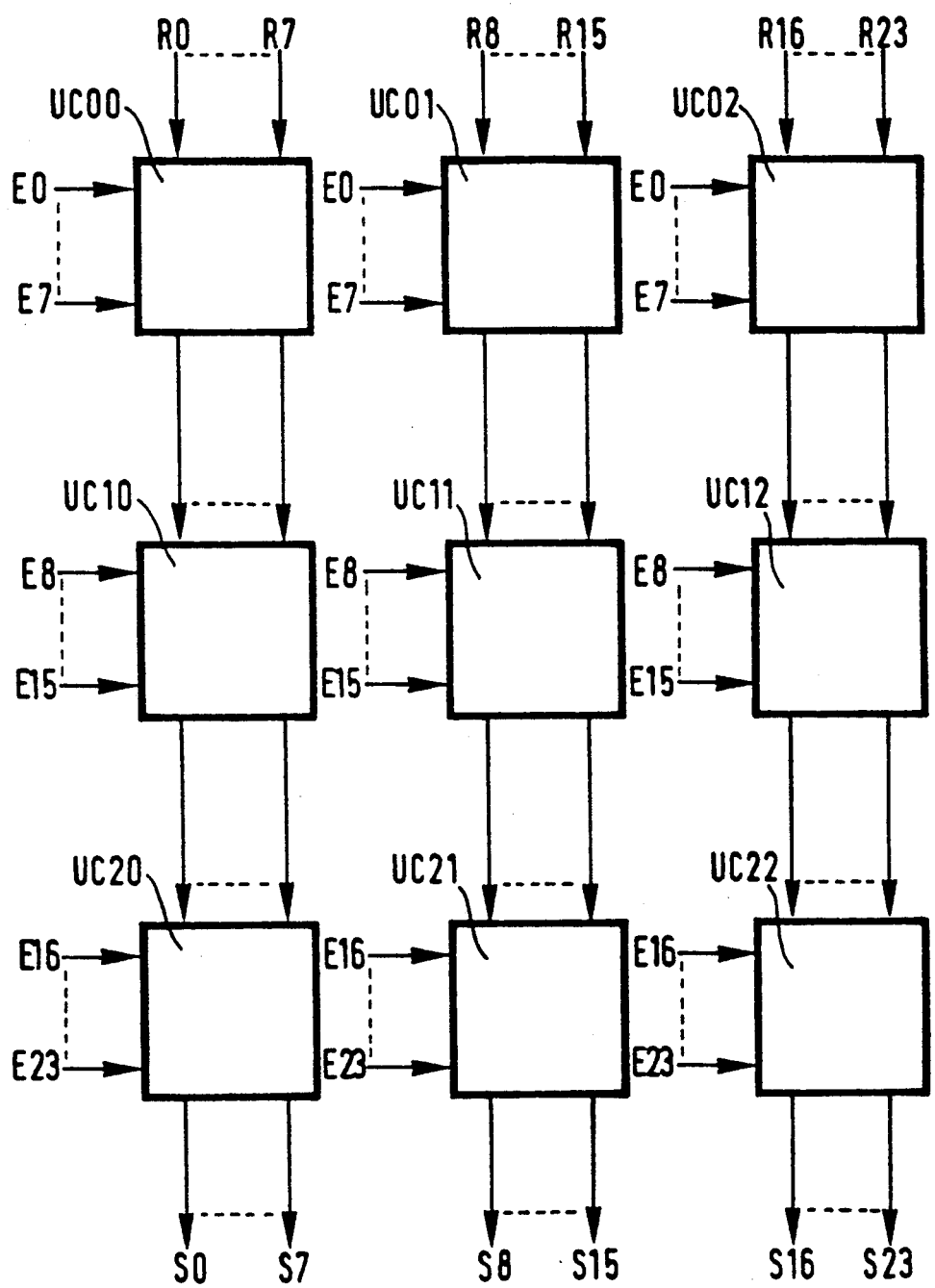
FIG. 3 shows a known architecture of a switching network, representing a square network.
Figure 6:
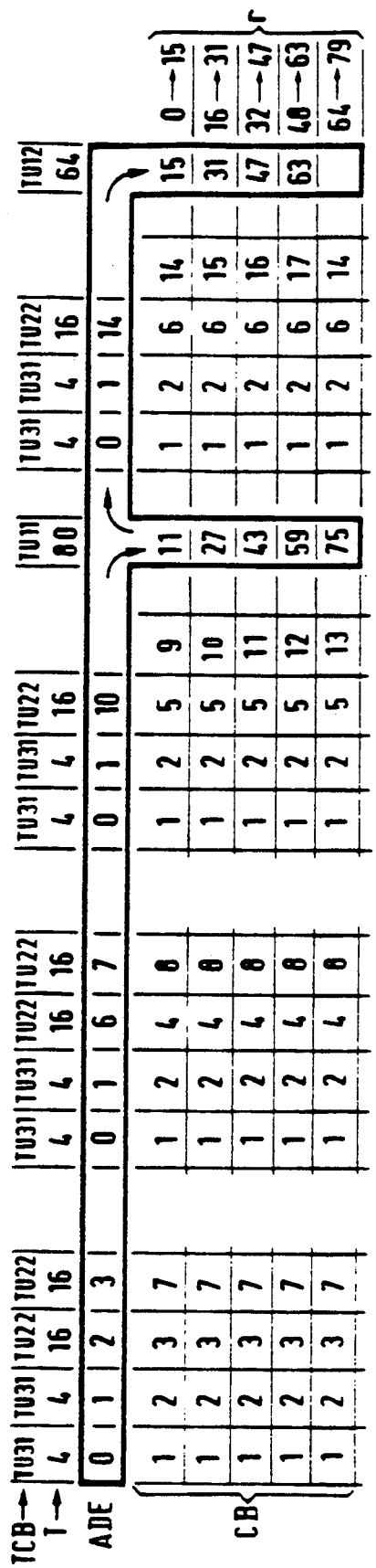
FIG. 6 is a table showing the principle of addressing said memory.

From FIGS. 2 and 6, the series obtained in the present example is made up of the periods:

4-4-16-16-4-4-16-16-4-4-16-80-4-4-16-64.

More generally, the incoming frame description memory 3 has to be dimensioned so that it can contain at least one series of periods the number of which is equal, for the set of all possible multiplexing structures, to the maximum value of the product of the multiplexing factors operative in these structures, except for those operative at hierarchy levels at which only tributaries can be multiplexed.

In the case of the hierarchy representing by FIG. 1, the figure shows that this maximum value is 21.

FIG. 1 shows that the maximum number of different periods for the same multiplexing structure is seven, and this applies to the multiplexing structure taken as an example, the maximum number of bits needed to code these periods in binary being equal to three.

Figure 4:
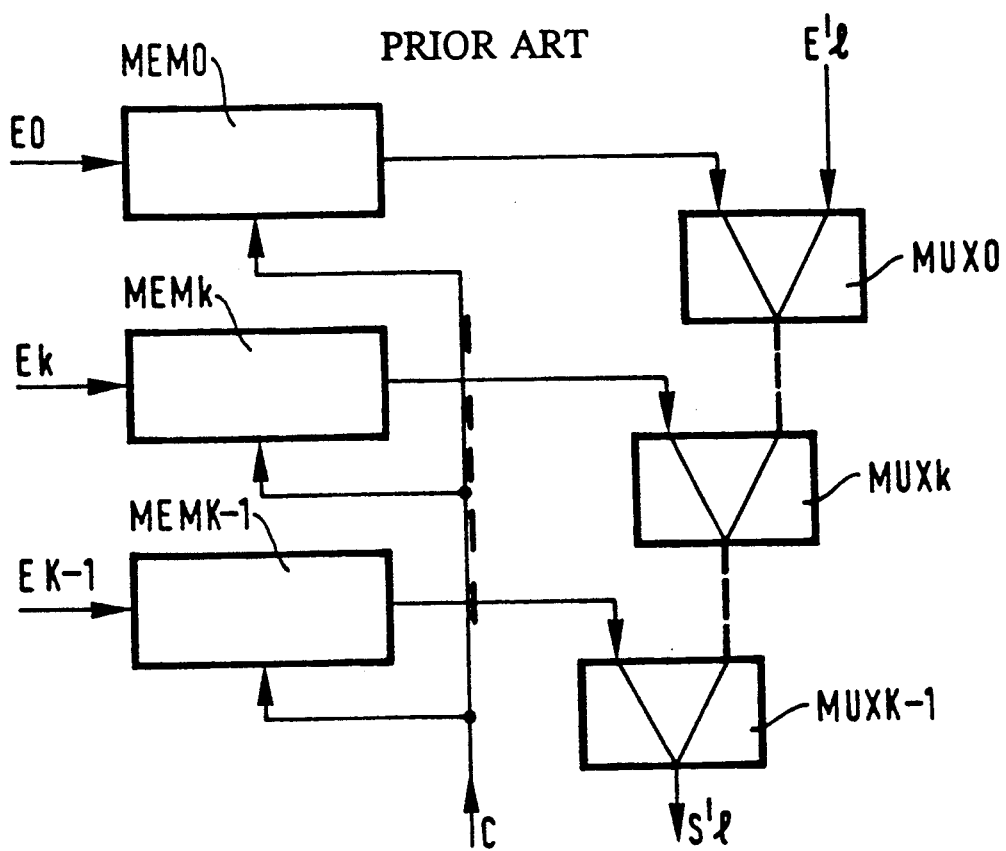
FIG. 4 shows the distribution of incoming frames to outgoing frames.

The architecture of a switching element for an incoming (or horizontal in the FIG. 4 sense) frame will now be described with reference to FIG. 11.

FIG. 11 shows the cross-connect signal memory 1 and its write address generator 2 controlled by reading the incoming frame description memory 3.

FIG. 11 also shows the read addressing circuit of the cross-connect signal memory 1.

The memory 1 read addresses are obtained by reading a connection memory 20 shared by the various cross-connect signal memories of a switching element. The connection memory 2 contains the distribution law required at the switching element in question and is read under the control of a read address generator 21 at the timing rate for insertion into each incoming (or vertical in the FIG. 4 sense) frame of the various signals constituting multiplexing units to be cross-connected obtained from so-called horizontal incoming frames. In this instance the insertion timing signal is the clock CK timing extraction from the incoming frames of the signals constituting containers to be cross-connected.

The required distribution law is stored in the connection memory 20 in the form of a correspondence table relating times defined by the insertion timing signal (representing connection memory addresses) and the cross-connect signal memory addresses to be inserted at those times (representing the content of the connection memory).

At each address of the connection memory 20 there is therefore stored an address for reading a memory for signals constituting multiplexing units to be cross-connected and a code identifying that memory among all memories of the switching element in question.

The connection memory 20 read addresses adl are generated in such a way that they comply with the principle of writing signals into the cross-connect signal memory 1, in other words to ensure that the memory 20 and therefore the memory 1 are read at identical addresses for signals constituting the same multiplexing unit to be cross-connected and at different addresses for signals constituting different multiplexing units to be cross-connected.

The implementation of the memory 20 read address generator 21 is therefore similar to that of the memory 1 write address generator 2 previously described, and it operates in an analogous manner, cooperating with an outgoing frame description memory 22 read sequentially at the timing rate of the clock CK.

The memories 20 and 21 are respectively dimensioned like the memories 1 and 3, except with regard to the content of the memories 1 and 20, which is different in nature, as has just been explained.

The memories 3, 20 and 22 contain "external" data, in other words data describing the required mode of operation of the cross-connect equipment for a given application. They can be written by cross-connect equipment control means, for example a microprocessor. This writing mode does not constitute any part of the present invention.

One embodiment of the means for extracting signals constituting multiplexing units to be cross-connected will now be described. This embodiment assumes frames broken down into sections of the same length (representing rows in the case of the multiplexing hierarchy outline above) in which the multiplexing units to be cross-connected are able to occupy only predetermined locations at positions defined relative to the start of the sections, and invariant for a given multiplexing unit, from one frame section to another and from one frame to another.

The multiplexing unit to be cross-connected signal extraction timing is then derived in a simple manner from the frame location synchronization signal by inhibiting this signal outside said predetermined locations.

In the case of the multiplexing hierarchy described above with reference to FIG. 1, frames organized in this way can be obtained using a frame restructuring interface of which one embodiment will now be described.

Before describing this embodiment, it will be useful to summarize the shape and the composition of the unrestructured frames.

Figure 12:
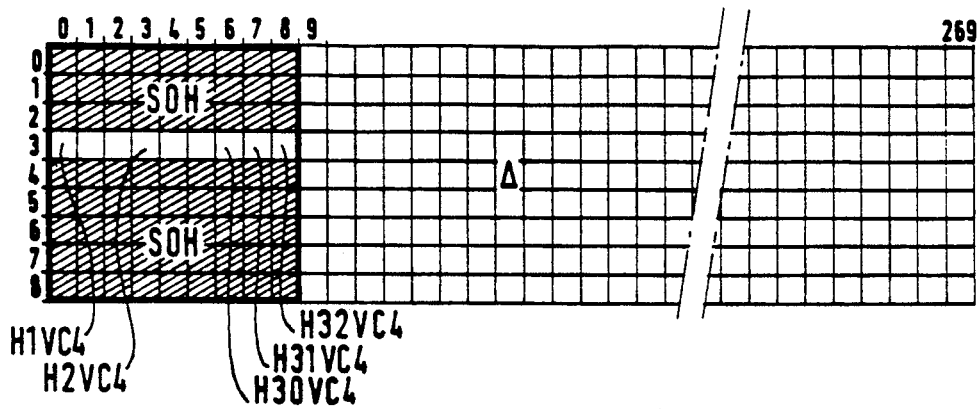
FIG. 12 shows an unrestructured frame.

FIG. 12 shows an unrestructured frame of this kind in the case where the highest hierarchy level is the level N3.

The shaded area in FIG. 12 contains the service signals SOH added to a multiplexing unit AU4 to constitute a frame and the unshaded area contains a multiplexing unit AU4.

A multiplexing unit AU4 is made up of a container VC4 to which are added indexing signals H1VC4 and H2VC4 which are always present and justification signals of which the signals H30VC4, H31VC4 and H32VC4 are always present except in the case of negative justification and of which the others (no reference symbols) are present only in the case of positive justification. The indexing signals H1VC4 and H2VC4 and, when they are present, the justification signals H30VC4, H31VC4 and H32VC4, respectively occupy columns 0, 3, 6, 7 and 8 of line 3; when present, the positive justification signals occupy columns 9, 10 and 11 of line 3.

Indexing signals H1VC4 and H2VC4 identify a container VC4 within a multiplexing unit AU4 and therefore within a frame, in practise by identifying the first byte of the container VC4, marked Δ in FIG. 12.

Figure 13:
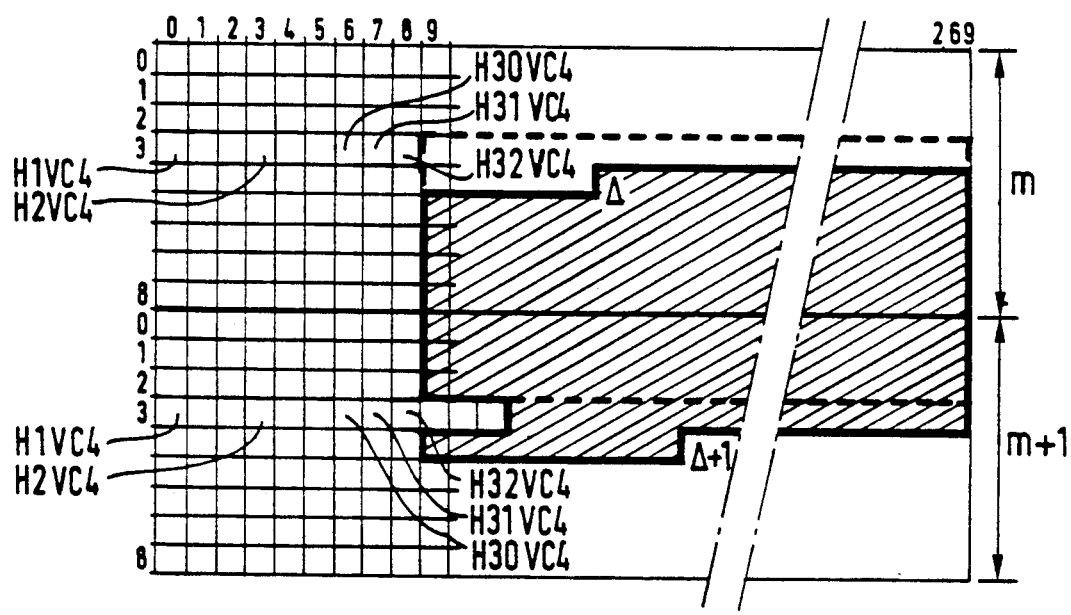
FIG. 13 shows the position of a containers VC4.

FIG. 13 shows the position of a container VC4 within a given frame "m" and the next frame "m+1" (into which it overlaps by the very nature of the indexing signals and by virtue of the location of these indexing signals in line 3 of the frames, as shown in FIG. 12), the space occupied by the container VC4 being shaded.

Figure 14:
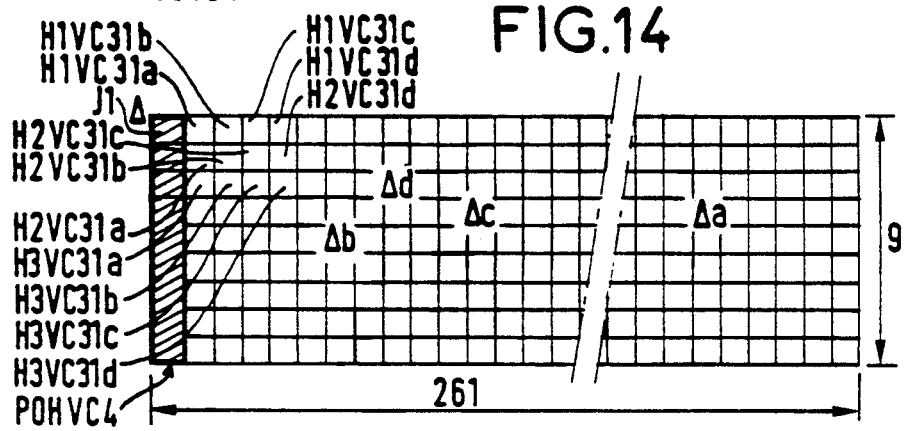
FIG. 14 is a table which shows the content of a container VC4.

The content of a container VC4 is represented in FIG. 14 in the form of a table with nine lines and 261 columns, also read from left to right and from top to bottom; if there is no justification of the container VC4 relative to the multiplexing unit AU4, this table fits perfectly into the frame shown in dashed outline in FIG. 13, formed by the bytes in columns 9 through 269 of lines 3 through 8 of frame "m" and 0 through 2 of frame "m+1".

In practise the shape of the container VC4 departs from this nominal shape because of positive or negative justification applied to the container for earlier frames and up to the current frame "m", represented by a shifting of the first byte of the container VC4 (indicated by the bytes H1VC4 and H2VC4 of frame "m") and because of any justification applied to the container for frame "m+1". FIG. 13 shows the case where positive justification is applied to the container for frame "m+1", which justification (indicated by the bytes H1VC4 and H2VC4 of frame "m+1") is reflected in the insertion of stuff bits in columns 9 through 11 in line 3 of frame "m+1".

In the case of negative justification applied to frame "m+1", again indicated by bytes H1VC4 and H2VC4 of frame "m+1", container VC4 would not have, as shown in FIG. 13, a part indented by three bytes in line 3 of frame "m+1" but would protrude by three bytes on this same line at the level of columns 6 through 8, this negative justification being applied by setting the bytes of VC4 at the location of bytes H30VC4, H31VC4 and H32VC4 (negative justification opportunity bytes of frame "m+1").

The container VC4 in question is formed by multiplexing four multiplexing units TU31a, TU31b, TU31c, TU31d occupying the unshaded area in FIG. 14 and by adding service signals POHVC4 occupying the shaded area, that is to say the first or lefthand column of the table with nine lines and 261 columns. Each multiplexing unit (TU31a, for example) is in turn formed by adding to a container (VC31a in this example) indexing signals H1VC31a and H2VC31a and justification signals of which one (H3VC31a) is provided to give a negative justification opportunity and is always present except in the case of negative justification; another (not shown) is present only in the case of positive justification. The indexing and justification signals of the four VC31 containers are at a specific position relative to the first byte of the container VC4 and can therefore be identified once the latter has been identified, so that these containers can be identified, in practise by identifying the location of the first byte, respectively designated Δa, Δb, Δc, Δd.

Figure 15:
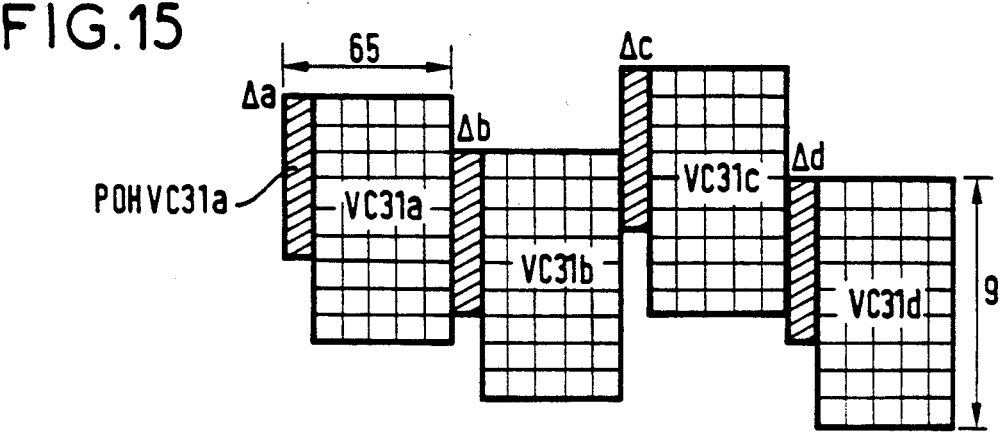
FIG. 15 is a table which shows the VC31 containers.

The various VC31 containers (VC31a, VC31b, VC31c, VC31d) are also shown in FIG. 15, again in the context of the multiplexing structure being discussed by way of example, each of them being formed by adding service signals POHVC31a, POHVC31b, POHVC31c, POHVC31d either to multiplexed multiplexing units TUG22 or to signals from a tributary C31, as appropriate. Each of the VC31 containers can be represented, as shown in FIG. 15, in the form of a table read from left to right and from top to bottom, comprising nine lines and 65 (=260/4) columns, of which the first, which contains the service signals, is incomplete; the number of signals needed to complete it is equal to the number of indexing and justification signals attached to each VC31 container in the absence of positive and negative justification to constitute the corresponding TU31 multiplexing unit.

It would be possible to show the containers of lower hierarchy levels in a similar way, in other words in the form of a table having nine lines and a number of columns inversely proportional to the hierarchy level in question, some columns being incomplete.

Because of the indexing and justification operations applied successively to the various hierarchy levels the position within the frames of signals constituting given containers is not predetermined but can be determined, ignoring for the moment the complexity of the resulting processing, from the indexing signals of the containers concerned and of the containers of higher hierarchy levels.

To simplify the following description of one embodiment of a frame restructuring interface it will be assumed that the multiplexing units to be cross-connected are the multiplexing units TU31a, TU31b, TU31c and TU31d.

The restructuring of the incoming frames begins with the extraction from these frames of the signals or bytes constituting the VC31a, VC31b, VC31c, VC31d containers, which first requires identification of the first byte of these containers in these frames. This identification entails identifying indexing signals of higher level (VC4) containers, which enables identification of the first byte of these VC4 containers, and additionally, the VC31 container indexing signals being at specific positions within the VC4 containers so identified, identification of the latter indexing signals, which in turn enables identification of the first byte of each VC31 container.

Figure 16:
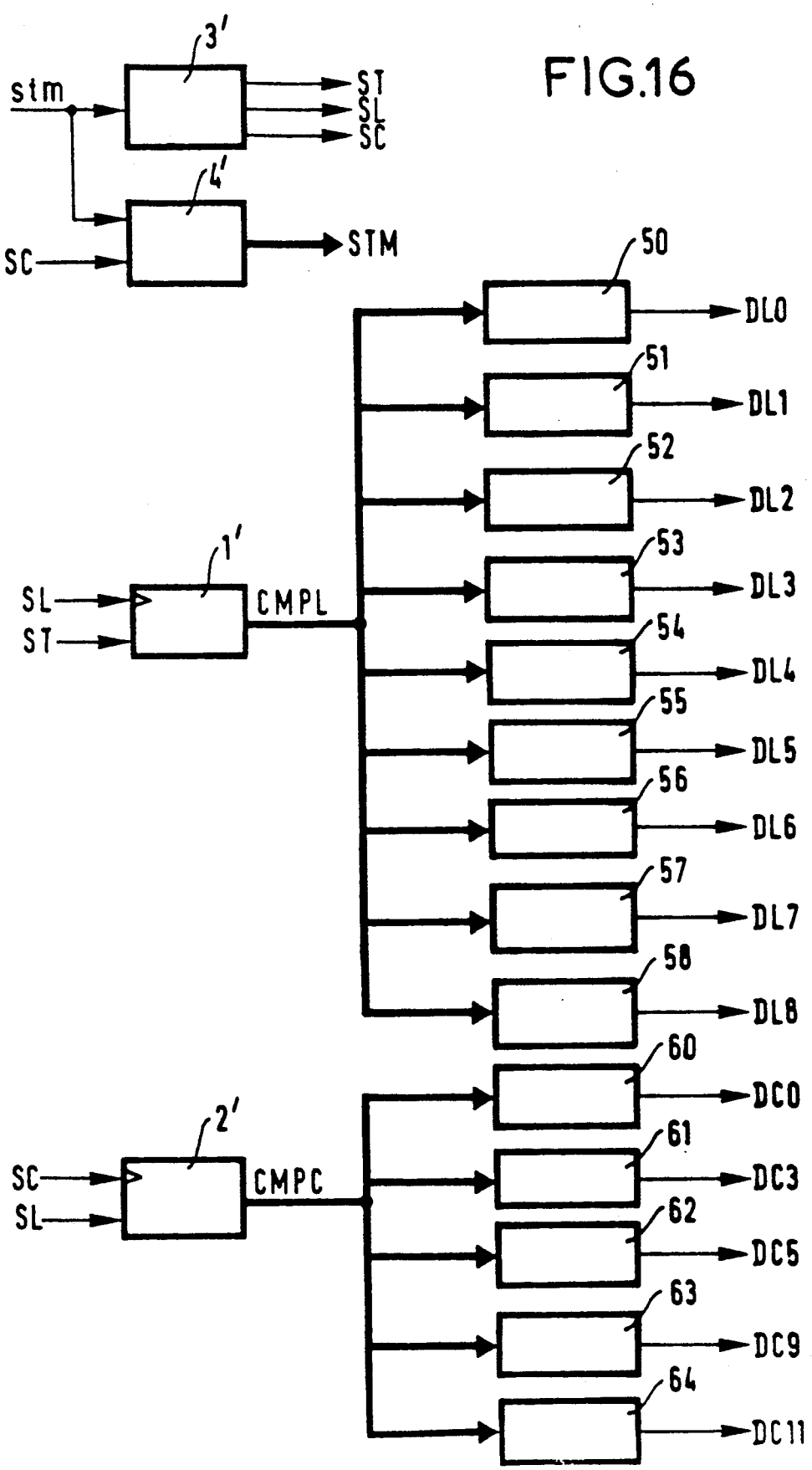
FIG. 16 shows the circuits which perform the identification function.

The circuits which perform the identification function have a number of elements in common, these being shown in FIG. 16. They include a line counter 1' which counts from 0 through 8 and is incremented by an incoming frame's line synchronization signal SL and which is reset to 0 by an incoming frame's frame synchronization signal ST and a column counter 2' which counts from 0 through 269 and is incremented by an incoming frame's column synchronization signal SC and is reset to 0 by the incoming frame's line synchronization signal SL.

The counters 1' and 2' supply on a number of parallel lines (represented by the bold lines) respective signals CMPL and CMPC indicating their respective count states.

The signals ST, SL and SC are obtained from a timebase 3' which receives at its input the incoming frames in serial form stm.

The incoming frames in parallel form STM, which are in the form of successive 8-bit words or bytes, are obtained at the output of a series-parallel converter 4' controlled by the column (i.e byte) synchronization signal SC and receiving at its input the incoming frames in serial form.

FIG. 16 also shows circuits 50 through 58 for detecting lines 0 through 8 of the incoming frames and supplying respective signals DLC through DL8 and circuits 60 through 64 for detecting columns 0, 3, 5, 9 and 11 of the incoming frames and supplying respective signals DC0, DC3, DC5, DC9, DC11.

These circuits simply decode the states of counters 1' and 2'; their output signals are logic signals representing logic "1" if the lines or columns concerned are in the incoming frame and logic "0" otherwise.

Figure 17:
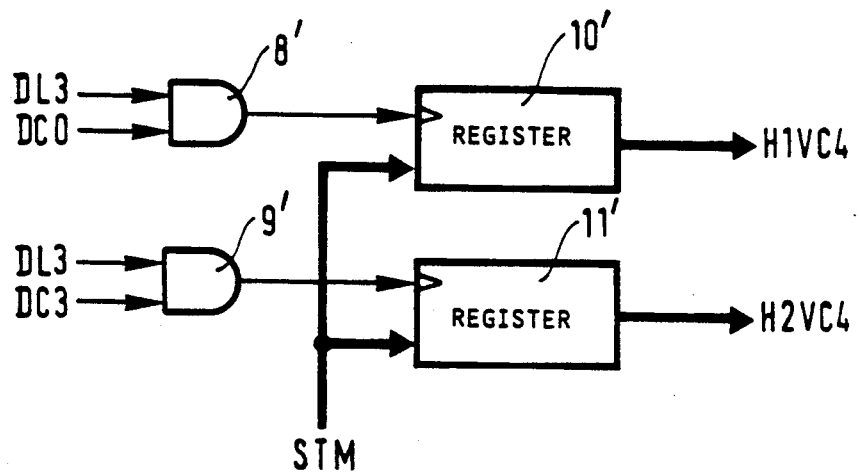
FIG. 17 shows the circuit used for detecting the indexing signals of the VC4 container.

The process for detecting the indexing signals H1VC4 and H2VC4 of the VC4 container will now be described with reference to FIG. 17 showing the circuit used and FIG. 18 which is a timing diagram for this circuit.

Indexing signals H1VC4 and H2VC4 are respectively in columns 0 and 3 of line 3 of the incoming frames and this circuit therefore comprises an "AND" gate 8' for detecting coincidence of the "3" state of the line counter and the "0" state of the column counter and an "AND" gate 9' for detecting coincidence of the "3" state of the line counter and the "3" state of the column counter, the gates 8' and 9' being respectively connected to receive signals DL3 and DC0 and signals DL3 and DC3.

The logic signals at the outputs of the "AND" gates 8' and 9' are applied to respective rising edge triggered clock inputs of two registers 10' and 11' which receive on their respective data inputs the incoming STM frames and in which the H1VC4 and H2VC4 bytes are respectively stored when they appear in the incoming frames.

Figure 18:
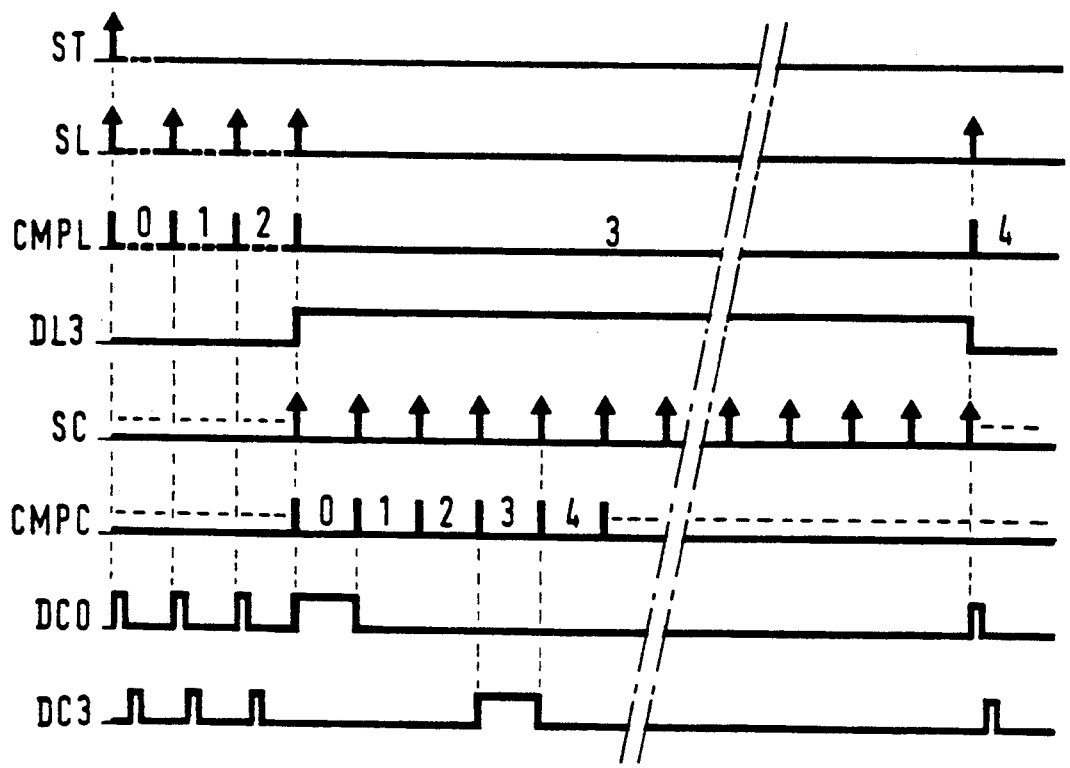
FIG. 18 is a timing diagram for the circuit used in FIG. 17.

FIG. 18 is a timing diagram for the signals ST, SL, CMPL, DL3, SC, CMPC, DCO and DC3. To make this diagram easier to read, the time scale has been expanded for the "3" state of the counter 1' output signal CMPL.

Figure 24:
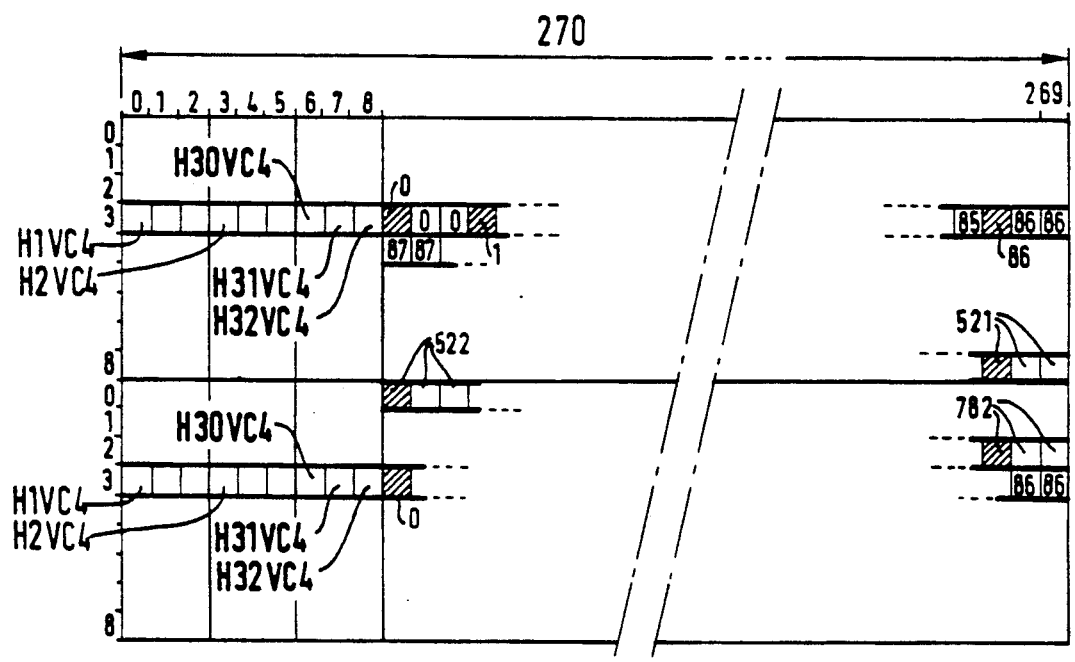
FIG. 24 shows the principle of detecting the first byte of a VC4 container.

The process for detecting the VC31a, VC31b, VC31c, VC31d container indexing signals will now be described. The process is similar for all four VC31 containers and that for one container only (VC31a) will now be described with reference to FIGS. 9A, 9B and 9E showing the detector circuit and FIGS. 4 and 5, previously described and respectively showing the location of the VC4 container in the incoming frames and the constitution of a VC4 container, and additionally with reference to FIG. 21 which is a timing diagram, FIG. 22 which shows the composition of the indexing bytes H1VC4 and H2VC4, and FIG. 24 which shows the principle of detecting the first byte of a VC4 container.

The indexing bytes H1VC4 and H2VC4 identify the position of the first byte of the VC4 container within the rectangle shown in dashed cutline in FIG. 13. In more precise terms, they identify one of 783 possible locations, shown shaded in FIG. 24 and spaced by three bytes, the VC4 containers being justified by three bytes, whether this is negative or positive justification. The value given by these indexing signals is designated $\Delta VC4$, and is between 0 and 782.

The first byte of a VC4 container is the first POHVC4 service byte J1, as shown in FIG. 14. This byte J1 is immediately followed by the byte H1VC31$a$, the first indexing byte of the VC31 container. The second VC31$a$ container indexing byte H2VC31$a$ is in the VC4 container at the location which is a fixed number of bytes after H1VC31$a$, in this instance 261 bytes (this is the width of the dashed outline rectangle in FIG. 13).

Figure 19:
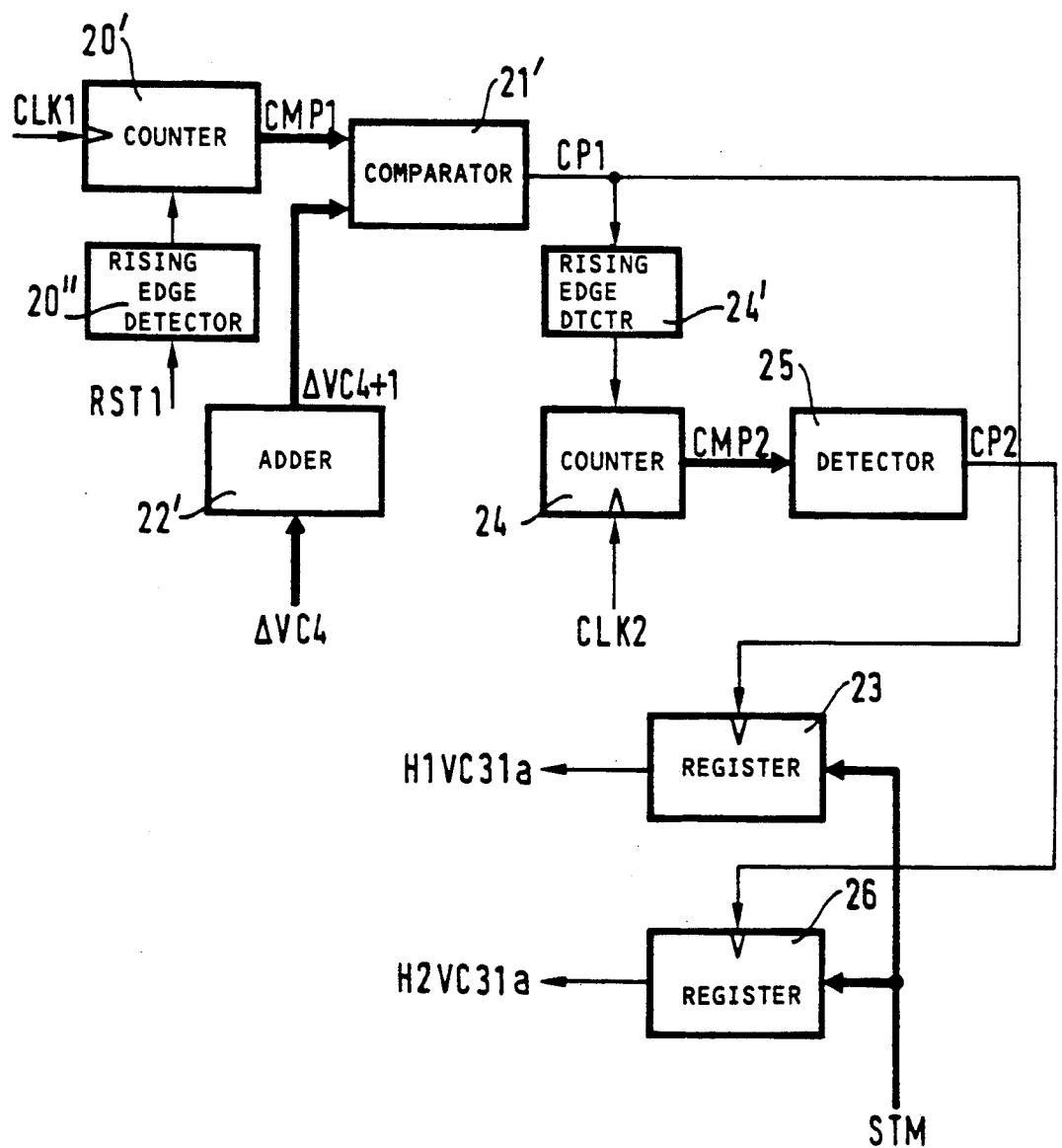
FIG. 19 shows the H1VC31a detector circuit which comprises a counter 20'.

As shown in FIG. 19, the H1VC31$a$ byte detector circuit comprises a counter 20' which is reset to 0 via a rising edge detector 20" by a signal RST1 in line 3, column 9 of the incoming frames, that is immediately after the location reserved for the H32VC4 justification signal, and incremented by a clock signal CLK1 obtained from the incoming frame column synchronization signal by blocking transitions of the latter during the first nine elementary locations or byte-times of each line and acting on only one in three of the transitions isolated in this way. The values that this counter can take are the values 0 through 782 shown in FIG. 24.

The output signal CMP1 of the counter 20' is applied to a comparator 21, which also receives the value $\Delta VC4+1$ from an adder 22' which adds the value "1" to the value $\Delta VC4$. If the value of the counter 20' reaches $\Delta VC4+1$, this means that the H1VC31$a$ byte location is in the frame. This byte is stored in a register 23 whose rising edge triggered clock input receives the output signal CP1 from the comparator 21', which has a rising edge at the time in question and whose data input receives the incoming frames STM.

At this time the signal CP1 commands counting by a counter 24 which counts from 0 through 260 and latches automatically on 260. The counter 24 is incremented by a clock signal CLK2 obtained from the incoming frame column synchronization signal SC by blocking the latter in columns 0 through 8 of lines 0, 1, 2, 4, 5, 6, 7, 8, in columns 0 through 5 of line 3 if the VC4 container is negative justified relative to the multiplexing unit AU4, in columns 0 through 11 of line 3 if the VC4 container is positive justified relative to the multiplexing unit AU4, or in columns 0 through 8 of line 3 if the VC4 container is not justified relative to the multiplexing unit AU4.

As shown in FIG. 13, the H1VC31$a$ byte of a given frame "m" can be identified a priori in any line 3 through 8 of this frame or in any line 0 through 2 of the next frame "m+1", so the H2VC31$a$ byte can itself be in any of lines 4 through 8 of the frame "m" or in any of lines 0 through 3 of the frame "m+1". The justification of the VC4 container to the "m+1" frame is therefore to be taken into account if line 3 of frame "m+1" is encountered during the counting performed by the counter 24.

The state of the counter 24 is indicated by its output signal CMP2. The state 260 of this counter is detected by a detector 25 supplying an output signal CP2 which has a rising edge at this time and which is applied to the rising edge triggered clock input of a register 26 which receives the STM frames on a parallel data input and responds to the arrival of the state 260 of the counter 24 by commanding the storage in the register 26 of the incoming STM frame byte occupying the corresponding location, this being the H2VC31$a$ byte.

To detect the VC31$b$, VC31$c$ and VC31$d$ container indexing signals the values $\Delta VC4+2$, $\Delta VC4+3$ and $\Delta VC4+4$ are compared with the state of the counter 20' as indicated by its output signal CMP1.

Figure 20:
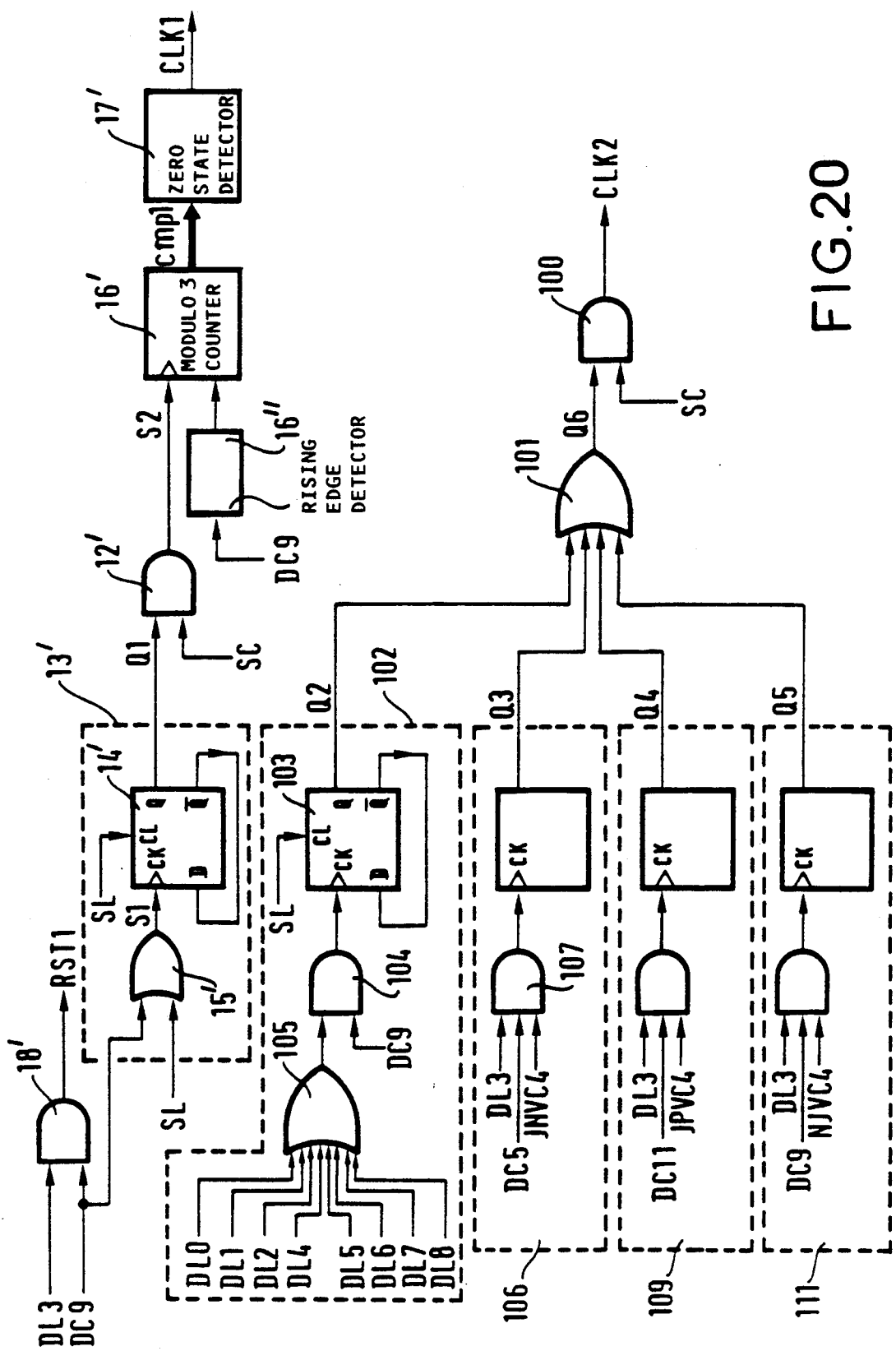
FIG. 20 shows the circuits which generate the signals CLK1, RST1 and CLK2.

The circuits which generate the signals CLK1, RST1 and CLK2 will now be described with reference to FIG. 20.

The circuit which generates the clock signal CLK1 includes an "AND" gate 12' for recognizing transitions of the column synchronization signal SC in columns 9 through 269 only. This gate receives the signal SC and the output signal Q1 from a circuit 13' which generates a time window extending from column 9 to column 269 of each line. Said time window is represented by a logic signal Q1 at logic "1". The circuit 13, includes a D type flip-flop 14' providing the signal Q1 on its output Q and receiving on its input D the complemented output signal Q. On its clear input CL it receives the line synchronization signal SL and on its clock input CK it receives the output signal S1 from an "OR" gate 15' receiving the line synchronization signal SL and the incoming frame column 9 detection signal DC9. The signal S2 at the output of the circuit 12' is applied to the rising edge triggered clock input of a "modulo 3" counter 16' which is reset to zero by the signal DC9 through a rising edge detector 16".

The clock signal CLK1 is obtained at the output of a circuit 17' detecting state 0 of the counter 16', the of this counter being indicated by its output signal cmp1.

The circuit generating the signal RST1 includes an "AND" gate 18' for detecting coincidence between a line 3 and a column 9 which receives the signal DL3 and the signal DC9.

Figure 21:
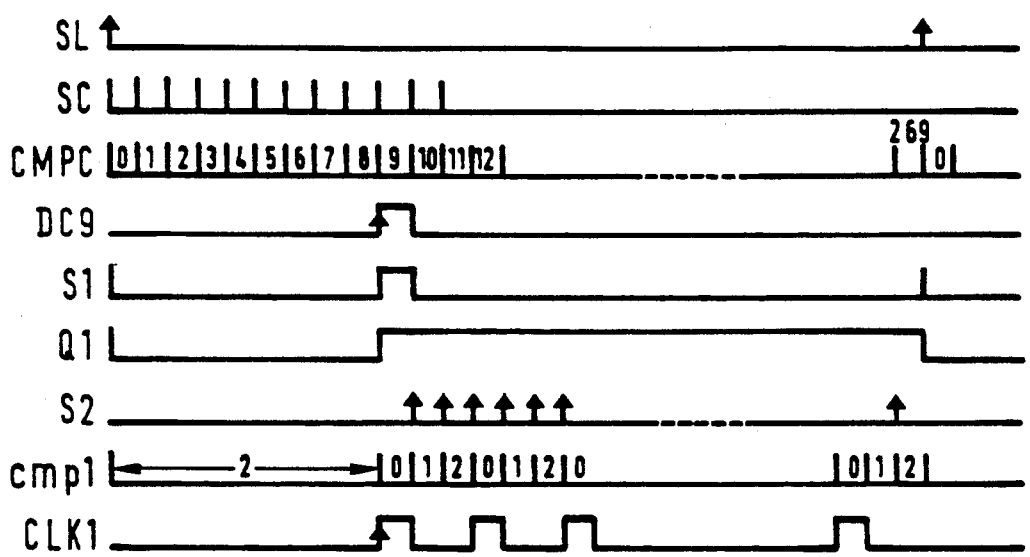
FIG. 21 is a timing diagram for the circuits in FIG. 20.

FIG. 21 is a timing diagram for these circuits.

The circuit generating the signal CLK2 includes an "AND" gate 100 for recognizing pulses of the column synchronization signal SC within a time window represented by a logic signal Q6 and extending, for lines 0 through 2 and 4 through 8 from column 9 to column 269 and for line 3 from column 6 to 269 or from column 12 to column 269 or from column 9 to column 269, depending on whether the container is negative or positive justified or not justified relative to the multiplexing unit AU4.

The corresponding time windows are represented by logic signals Q2 through Q5 at logic "1", the "AND" gate 100 receiving the column synchronization signal SC and the signal Q6 from an "OR" gate 101 receiving the signals Q2 through Q5.

The signal Q2 is obtained from a time window generator circuit 102 which includes a D type flip-flop 103 whose Q output provides a signal Q2 and whose complemented output Q is looped to the D input, the clear input CL receiving the line synchronization signal SL and the clock input CK receiving the output signal of an "AND" gate 104 receiving the column 9 detection signal DC9 and the output signal from an "OR" gate 105 receiving the signals DL0 through DL2 and DL4 through DL8 detecting lines 0 through 2 and 4 through 8.

The signal Q3 is obtained from a time window generator circuit 106 similar to the circuit 102 except that the "AND" gate 104 is replaced with an "AND" gate 107 receiving the signals DL3 and DC5 and a VC4 container negative justification detection signal JNVC4.

The signal Q4 is obtained from a time window generator circuit 109 similar to the circuit 106 except that the negative justification detection signal JNVC4 is replaced with a positive justification detection signal JPVC4.

The signal Q5 is obtained from a time window generator circuit 111 similar to the circuits 106 and 109 except that the signals JNVC4 and JPVC4 are replaced by a VC4 container non-justification detection signal NJVC4.

The circuits generating the VC4 container negative, positive and non-justification signals JNVC4, JPVC4 and NJVC4 will now be described with reference to FIGS. 9D and 9E.

Figure 22:
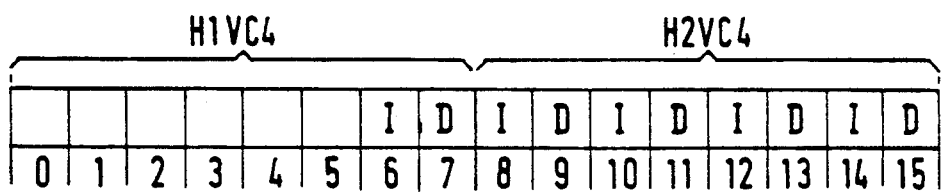
FIG. 22 shows the composition of the indexing bytes.

The negative/positive/no justification indication is given by bytes H1VC4 and H2VC4, the composition of which is shown in FIG. 22, in which the bits of these bytes are numbered 0 through 7 for the H1VC4 byte and 8 through 15 for the H2VC4 byte.

The bits with the numbers 6, 8, 10, 12 and 14 (marked I) are inverted from one frame to the next to indicate positive justification.

The bits with the numbers 7, 9, 11, 13 and 15 (marked D) are inverted from one frame to the next to indicate negative justification.

Absence of inversion of the I and D bits from one frame to the next indicates the absence of justification.

FIG. 23 shows the circuits which generate the signals JNVC4, JPVC4 and NJVC4.

These circuits share two registers 200 and 201 which receive on their data inputs H1VC4(n) and H2VC4(n) bytes relating to a given frame "n", output from the registers 10 and 11 shown in FIG. 17, the clock inputs of these registers receiving the same clock signals as the registers 10 and 11 (CLKX and CLKY). At the outputs of these registers are obtained the H1VC4(n-1) and H2VC4(n-1) bytes relating to the previous frame "n-1".

The JPVC4 signal is generated as follows: the bits with numbers 6, 8, 10, 12, 14 of the H1VC4(n) and H2VC4(n) bytes - marked eb6(n), eb8(n), eb10(n), eb12(n), eb14(n) are respectively applied to a first input of five "exclusive-OR" gates 2020 through 2024. A second input of each "exclusive-OR" gate receives the bits with the numbers 6, 8, 10, 12, 14 of the H1VC4(n-1) and H2VC4(n-1) bytes - marked eb6(n-1), eb8(n-1), eb10(n-1), eb12(n-1), eb14(n-1). The positive justification control signal JPVC4 is obtained at the output of a majority decision logic circuit 204.

The JNVC4 signal is obtained as follows: the bits with the numbers 7, 9, 11, 13, 14, 15 of the H1VC4(n) and H2VC4(n) bytes - marked eb7(n), eb9(n), eb11(n), eb13(n), eb14(n), eb15(n) are respectively applied to a first input of five "exclusive-OR" gates 2050 through 2054. A second input of these "exclusive-OR" gates receives the bits with the numbers 7, 9, 11, 13, 15 of the H1VC4(n-1) and H2VC4(n-1) bytes marked eb7(n-1), eb9(n-1), eb11(n-1), eb13(n-1), eb15(n-1). The negative justification control signal JNVC4 is obtained at the output of a majority decision logic circuit 206.

The no justification control signal NJVC4 is obtained at the output of a "NCR" gate 207 receiving the signal JNVC4 and the signal JPVC4.

Figure 25:
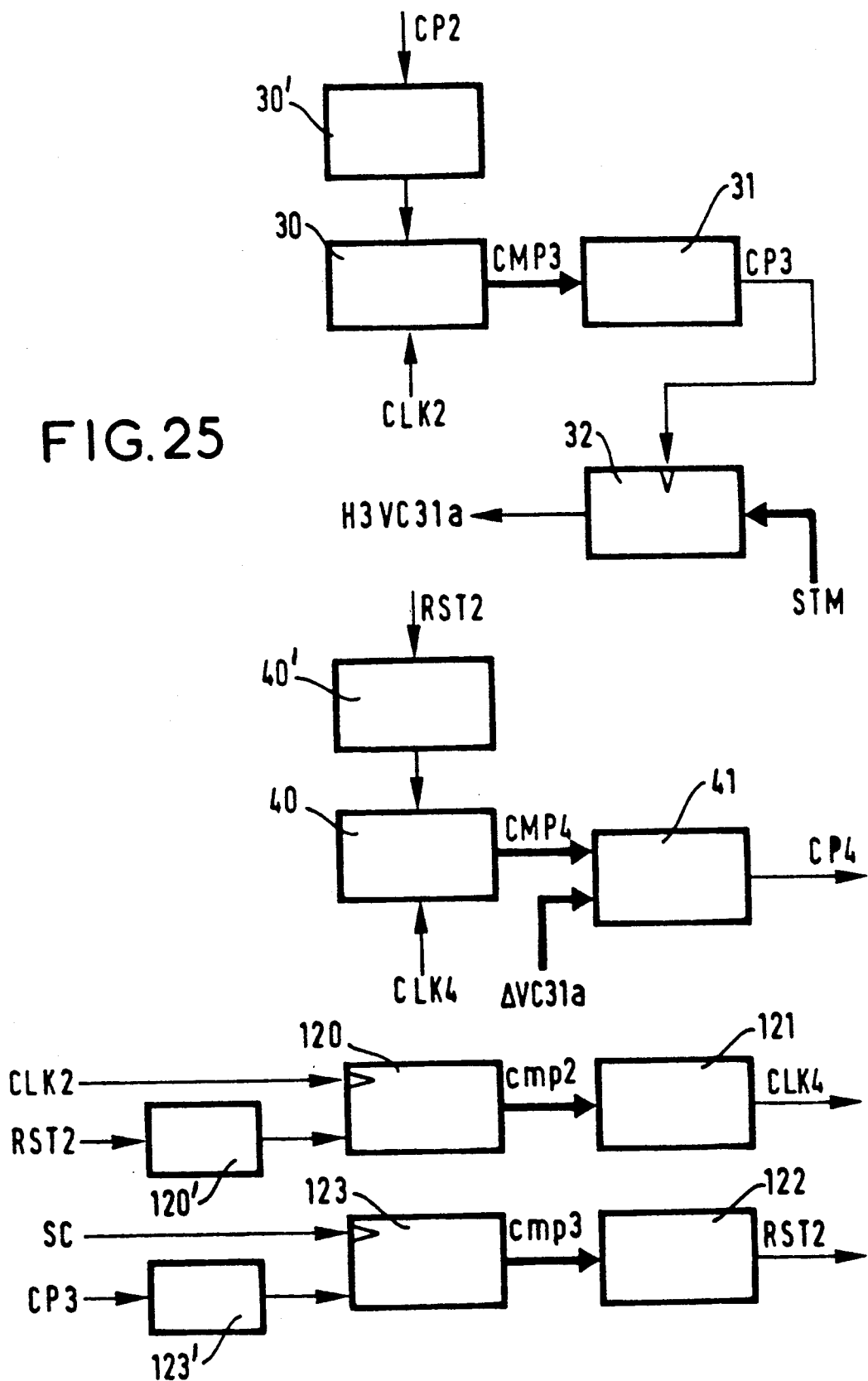
FIG. 25 shows the circuit used for detecting the first byte of the VC31a container.
Figure 26:
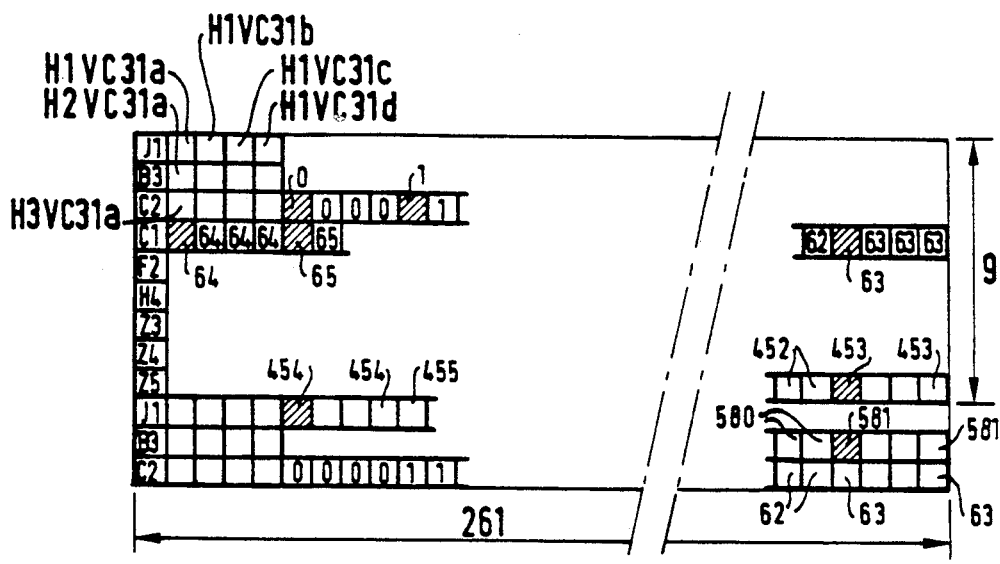
FIG. 26 shows the principle of identifying the first byte of the VC31a container.
Figure 27:
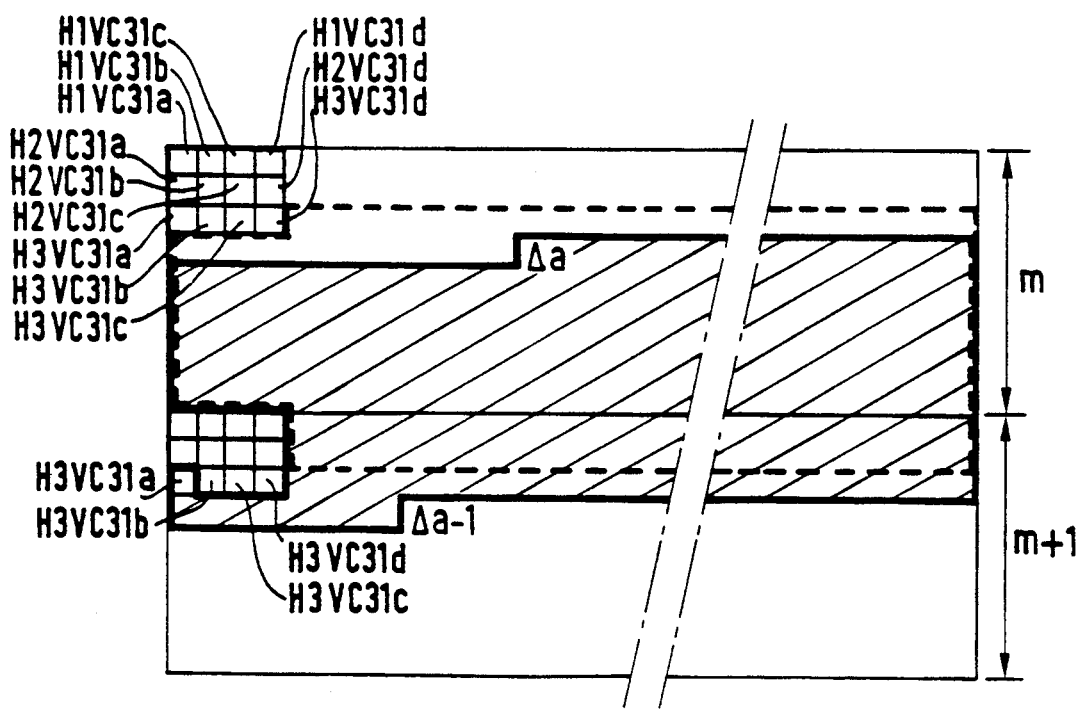
FIG. 27 shows the space occupied by a VC31 container within two consecutive VC34 containers.

The process for detecting the first byte of the VC31a container will now be described with reference to FIG. 25 showing the circuit used, FIG. 26 showing the principle of identifying this byte and FIG. 27 showing, subject to reservations to be explained later, the space occupied by a VC31 container within two consecutive VC34 containers, of rank "m" and "m+1".

The indexing bytes H1VC31a and H2VC31a identify the position Δa of the first byte of the VC31a container within the space shown in dashed outline in FIG. 27, representing the shape of the VC31a container in the absence of any justification, ignoring the "by 4" multiplexing factor with the other containers VC31b, VC31c, VC31d, as this is difficult to show in the figure. The real space, that is to say the space allowing for the justifications, is different and shading is used to indicate an example of the space occupied by a VC31 container within two consecutive VC4 containers "m" and "m+1". In this example negative justification is applied. The indexing bytes H1VC31a and H2VC31a identify one of 582 possible locations, shown shaded in FIG. 26 and spaced by four bytes to allow for the multiplexing of VC31 containers by a single byte. ΔVC31a denotes the value (between 0 and 581) indicated by these indexing signals.

When the H1VC31a and H2VC31a bytes have been detected, the VC31a container justification byte H3VC31a is detected using a counter 30 identical to the counter 24 and operating in the same way, except that it is controlled by the output signal CP2 from the detector circuit 25 through a given direction transition detector 30', so that it begins to count from 0 to 260 when the H2VC31a byte is detected, the H3VC31a byte being situated 261 bytes after the H2VC31a byte, and by means of a circuit 31 detecting the state 260 of this counter, the output signal CP3 of which, when the counter 30 reaches the 260 state, commands the storage of the corresponding H3VC31a byte of the incoming frames STM in a register 32 receiving on its parallel data input the STM frames and on its clock input the signal CP3.

When the H1VC31a, H2VC31a and H3VC31a bytes have been identified, the first byte of the VC31a container is detected using a counter 40 which is reset through a given direction transition detector 40' by a signal RST2 for byte-times after the detection of the H3VC31a byte and which is incremented by a clock signal CLK4 obtained from the incoming frame column synchronization signal SC by blocking transitions of the latter in columns 0 through 8 for lines 0 through 2 and 4 through 8, in columns 0 through 5 for line 3 if the VC4 container is negative justified relative to the multiplexing unit AU4, in columns 0 through 11 for line 3 if the VC4 container is positive justified relative to the multiplexing unit AU4, or in columns 0 through 9 for line 3 if the VC4 container is not justified relative to the multiplexing unit AU4 and by ignoring three out of four of the transitions thus isolated. The values that this counter can take are the values 0 through 581 shown on FIG. 26. The output signal CMP4 of the counter 40 is applied to a comparator 41 which receives also the value ΔVC31a. When the state of the counter 40, as indicated by its output signal CMP4, reaches this value, this means that the corresponding location is that occupied by the first byte of the VC31a container. The output signal CP4 of the comparator 41 has a transition at this time.

The circuit generating the clock signal CLK4 and the signal RST 2 will now be described.

The signal CLK2 is applied to the clock input of a counter 120 which divides by four and which is reset via a given direction transition detector 120' by the signal RST2. The output signal cmp2 of the counter 120 is applied to a circuit 121 detecting the zero state of this counter. The clock signal CLK4 is obtained at the output of the circuit 121.

The signal RST2 is obtained at the output of a circuit 122 detecting state 3 of a counter 123 which latches automatically at 3, the count state of this counter being indicated by its output signal cmp3. This counter is incremented by the column synchronization signal SC and cleared by the signal CP3 through a given direction transition detector 123'.

When the first byte of the VC31a container has been identified the subsequent bytes of this container are identified, as shown in FIG. 29, using a counter 50''' which is cleared through a given direction transition detector 50' by the signal CP4 on detection of the first byte of the VC31a container and counting "modulo 4" at the timing rate of a clock signal CLK5 obtained from the incoming frame column synchronization signal SC by blocking this, in order to ignore bytes other than those constituting the VC31a container:

- during columns 0 through 8 of lines 0 through 2 and 4 through 8 of the incoming frames,
- during columns 0 through 5 of line 3 of the incoming frames if the VC4 container is negative justified relative to the multiplexing unit AU4,
- during columns 0 through 11 of line 3 of the incoming frames if the VC4 container is positive justified relative to the multiplexing unit AU4,
- during columns 0 through 8 of line 3 of the incoming frames if the VC4 container is not justified relative to the multiplexing unit AU4,
- during the bytes constituting the POHVC4 service signals,
- during the H1VC31 and H2VC31 indexing bytes of the four VC31 containers.

The subsequent bytes of the VC31a container are detected by means of a circuit 50'' for detecting changes to the "zero" state of the counter 50 supplying a signal CP'6, the state of the counter being indicated by its output signal cmp6.

The H1VC31 and H2VC31 bytes are detected in the manner previously described for the VC31a container.

The bytes constituting the POHVC4 service signals are detected, as shown in FIG. 28, by means of a detector 51' which detects eight consecutive passages through 0 of a counter 51 counting from 0 through to 260 (the number of bytes separating two consecutive POHVC4 bytes in a VC4 container) at the timing rate of the CLK2 clock signal and by detecting the first byte J1 of the VC4 container, in a similar manner to that described in relation to FIG. 19, by detecting coincidence of the count state CMP1 of the counter 20, and the value ΔVC4, using a comparator 52'' providing an output signal CP5 having a transition in a given direction on detection of this coincidence, applied through a detector 52' for said given direction transition to the reset to zero input of the counter 51''' to command the latter to count on such detection.

The circuit generating the CLK5 clock signal will now be described.

This circuit comprises an "AND" gate 130 which passes pulses of the column synchronization signal SC if the following conditions are met simultaneously (this simultaneity is detected by an "AND" gate 131):

- presence of one of the time windows represented by the signals Q2 through Q5 (whence application of the output signal Q6 of the "OR" gate 101 (FIG. 20) to an input of the "AND" gate 131),
- no detection of a POHVC4 byte (whence application of the signal CP7, inverted by an inverter 132, the "AND" gate 131), and
- no detection of an H1VC31 or H2VC31 indexing byte of any of the four VC31 containers (whence the application to an input of the "AND" gate 131 of the signal, inverted by an inverter 133, from an "OR" gate 134 receiving on its inputs the signals CP1 and CP2 relating to the four containers and assigned the indexes a for the VC31a container, b for the VC31b container, c for the VC31c container and d for the VC31d container.

The bytes forming the VC31a container detected in this way and extracted from the STM incoming frames at the times concerned are stored in a buffer 60 (see FIG. 30) as and when they are detected, one or two writes in the buffer 60, in other words one or two pulses of the CP' output signal of detector 50'', being removed (see below) according to whether the VC31a container is not justified or is positive justified.

Non-justification or positive justification of the VC31a container is detected in a similar way to that described above for the VC34 container, this time on the basis of the H1VC31a and H2VC31a indexing signals constituted in the same manner as the H1VC4 and H2VC4 indexing signals.

The CP6 signal is obtained at the output of a circuit 53' for blocking pulses of the CP'6 signal either at the location of the H3VC31a byte signalled by the CP3 signal (FIG. 25), and four byte-times after this location, or four byte-times after this location, depending on the state of the logic signals NJVC31a indicating non-justification and JPVC31a indicating positive justification of the VC31a container.

Figure 30:
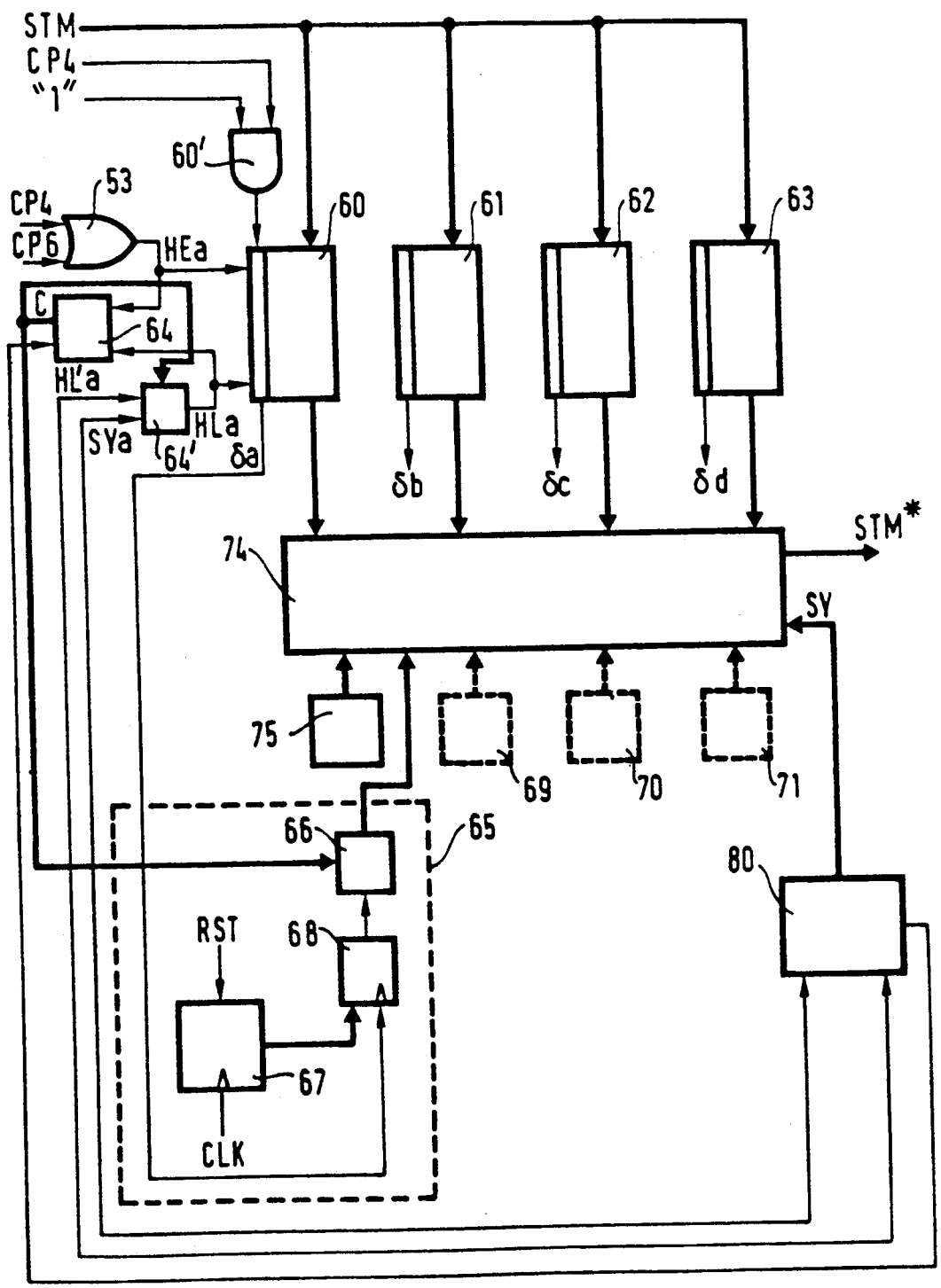
FIG. 30 shows three storing buffers.

The same process is applied for the other three containers VC31b, VC31c, VC31d, the bytes of which are respectively stored in three buffers 61, 62, 63 (FIG. 30).

With each byte of a VC31 container stored in these buffers there is associated a marking bit δa, δb, δc, δd for the containers VC31a, VC31b, VC31c, VC31d and indicating whether this byte is the first byte of a container or not.

The writing of this marking bit is commanded in the case of the VC31a container, for example, by the CP4 signal supplied by the circuit for detecting the first byte of a VC31 container. In this example the bit δa is at logic "1" when the byte is the first byte. This signal is obtained at the output of an "AND" gate 60, receiving on a first input a logic "1" signal and on a second input the CP4 signal.

HE is the timing rate for extracting incoming frames from the bytes constituting these containers, in turn obtained in the case of the VC31a container, for example, by using a logic gate 53 to combine transitions of the CP4 output signal of the comparator 41 (FIG. 25) and the CP6 output signal of the detector 50'' (FIG. 29).

The assignment of the byte-times of the restructured outgoing frames to these bytes is fixed by a clock HL'

(HL'a in the case of the VC31a container, for example) itself determined in a timebase 80 from frame synchronization signal ST*, line synchronization signal SL* and column synchronization signal SC* of the outgoing frames restructured so as to have, for each container to be processed, an assignment of the bytes constituting this container by columns within the restructured frames.

Figure 31:
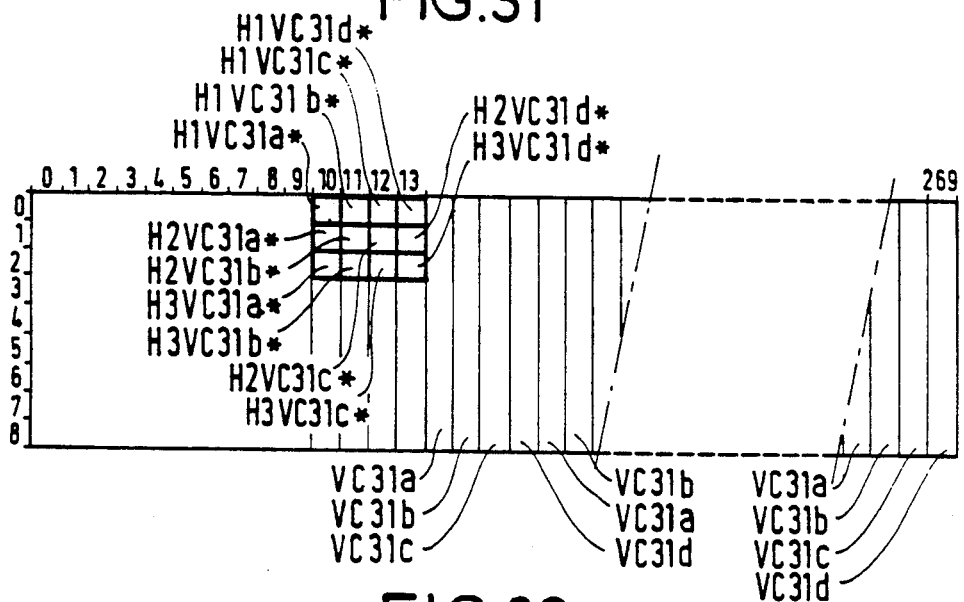
FIG. 31 shows an assignment of the bytes constituting a container by columns within the restructured frames.

FIG. 31 shows this assignment by columns in the case of the VC31 containers.

The assignment is performed as follows:

- columns 14, 18,......................266 and column 10 for lines 2 through 8 are assigned to the VC31a container,
- columns 15, 19,......................267 and column 11 for lines 2 through 8 are assigned to the VC31b container,
- columns 16, 20,......................268 and column 12 for lines 2 through 8 are assigned to the VC31c container,
- columns 17, 21,......................269 and column 13 for lines 2 through 8 are assigned to the VC31d container.

The bytes from columns 0 through 9 of lines 0 through 8 are stuff and/or service bytes.

Into columns 10 through 13 of lines 0 and 1 are inserted indexing bytes H1VC31* and H2VC31* of the containers to be processed, with the index a, b, c or d according to whether they relate to the VC31a, VC31b, VC31c or VC31d container.

The justification bytes of the containers to process in the restructured frames enable the timing rate of the read clock HL to be matched to the timing rate of the write clock HE of the buffers, for example the timing rate of the read clock HLa is matched to the timing rate of the write clock HEa in the case of the buffer 60. This timing adaptation is performed conventionally by means of a device for generating justification/non-justification requests (64 in the case of the VC31a container) and a circuit for blocking the clock HL' (64' in the case of the VC31a container), the justification/non-justification request generator device comparing the phases of the clock HE and the clock HL from the circuit for blocking the clock HL'. Depending on whether, for a given frame, the result of this comparison exceeds a first threshold of given sign or a second threshold of opposite sign or lies between these two thresholds, a positive justification request or a negative justification request or a non-justification request is generated for this frame. The non-justification, positive justification or negative justification request is acted on in the following frame and, in the first case, causes the insertion of a stuff byte at the location, fixed in this frame, of the corresponding justification byte H3VC31*, this location being in column 10, line 2 in the case of the VC31a container, for example; in the second case, insertion of a stuff byte at this location and at the location four byte-times later; and, in the third case, no insertion of a stuff byte into those of columns 10 through 269 assigned to the container concerned.

The justification or non-justification request generated by the device 64 for the frame in question is stored by this device until the next frame, the memory in which it is stored being reset on a command from the timebase 80 at the respective locations in columns 14 through 17 of line 2 for the VC31a, VC31b, VC31c, VC31d containers.

The buffer read clock HL is therefore derived from the clock HL' (itself sourced from the timebase 80 and obtained from the restructured frame column synchronization signal SC* by systematically blocking this synchronization signal at the locations of bytes not assigned to the VC31 container in question and indicated previously), by blocking or not the clock HL' according to the justification/non-justification request status for the VC31 container for the previous frame.

The HLa read clock is therefore obtained from the HL'a clock by blocking the latter in columns 10 and 14 of line 2 in the case of positive justification of the VC31a container in the restructured frames or in column 10 of line 2 in the case of non-justification of the VC31a container in the restructured frames or by not blocking the clock in the case of negative justification of the VC31a container in the restructured frames.

The blocking circuit 64' receives from the timebase 80, in addition to the clock HL'a, a synchronization signal SYa identifying the locations mentioned above, and control signals C from the justification/non-justification request generator device 64 indicating justification or non-justification requests for the VC31a container in the restructured frame.

The value, referred to hereinafter as the "calculated" value, of the H1VC31*, H2VC31* indexing bytes to be inserted in columns 10 through 13 of lines 0 and 1 of a given restructured frame during the formation of that frame is calculated, for the VC31a container, for example, by a circuit 65 for calculating the value of the indexing signals for this container, from the "observed" value of these indexing bytes for the previous frame, determined during the construction of the previous frame (as described below) by adding the value "1", "−1" or "0" to this value, using an adder 66 receiving control signals C from the device 64 according to whether a positive or negative justification request or no justification request has been executed.

The "observed" value of the indexing bytes is obtained as follows, taking for example the H1VC31a* and H2VC31a* bytes of the VC31a container.

A counter 67 reset to zero by a signal RST in column 14 of line 2 (detected from the frame synchronization signal ST*, line synchronization signal SL* and column synchronization signal SC* of the restructured outgoing frames) is incremented by a clock signal CLK derived from the column synchronization signal SC* of the restructured outgoing frames by taking one byte in four and blocking it in columns 0 through 9 of lines 3 through 8 and in columns 0 through 13 of lines 0 through 2. When a first byte of a VC31a container is detected at the output of the buffer 60, by virtue of the corresponding marking bit δa, the count state of this counter, representing the required value, is stored in a register 68 whose clock input receives the δa bit read in the buffer 60, the data inputs of this register being connected to the outputs of the counter 67.

The restructured frames STM* are obtained at the output of a multiplexer 74 whose data inputs are connected to the respective circuits 65, 69, 70 and 71 for calculating the value of the H1VC31* and H2VC31* indexing signals for the VC31a, VC31b, VC31c, VC31d containers, to the outputs of the four buffers 60 through 63 (the signals constituting the VC31a, VC31b, VC31c, VC31d containers) and to the outputs of a source 75 stuff and/or service signals.

The control inputs of the multiplexer 74 receive signals SY from the timebase 80 enabling insertion of indexing signals in columns 10 through 13 of lines 0 and 1, insertion of stuff and/or service signals in columns 0 through 9 of lines 0 through 8 and insertion of signals constituting containers to be processed as described above.

In the case of the VC31a container, for example, the insertion of stuff signals in columns 10 and 14 of line 2 in the case of positive justification of this container or in column 10 of line 2 in the case of non-justification of this container can be achieved in a simple way by rereading a byte stored in the buffer 60, by blocking the read clock of this buffer at these locations.

Figure 32:
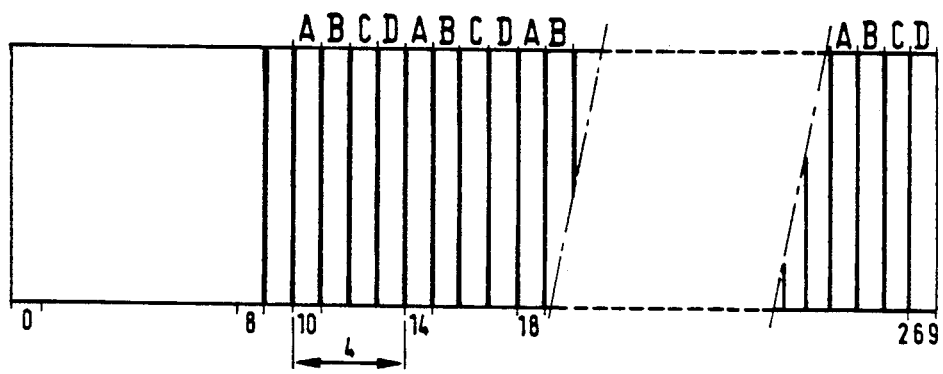
FIG. 32 shows the assignment of the columns of the restructured frames to the various restructured multiplexing units.

FIG. 32 shows the assignment of the columns of the restructured frames to the various restructured multiplexing units TU31*. ABCD are the columns respectively assigned to the restructured multiplexing units TU31*a, TU31*b, TU31*c, TU31*d.

| | |
|---|---|
| The A columns are the columns 10, 14 | 266. |
| The B columns are the columns 11, 15 | 267. |
| The C columns are the columns 12, 16 | 268. |
| The D columns are the columns 13, 17 | 269. |

The number of columns assigned per frame to each restructured multiplexing unit TU31* is equal to the number of bytes assigned to the corresponding multiplexing unit in a non-restructured frame divided by the number of lines (that is: 585/9=65).

Figure 33:
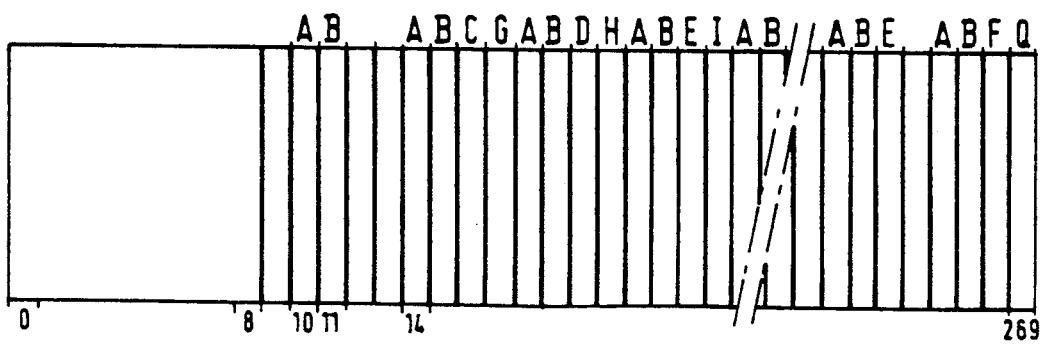
FIG. 33 shows an example of the assignment of columns of the restructured frames to the restructured multiplexing units. for extracting signals constituting multiplexing units to be cross-connected.

FIG. 33 shows by way of example the assignment of the columns of the restructured frames to the restructured multiplexing units TU31a*, TU31b*, TU22a* through TU22f*, TU11a* through TU11e* and TU12a* through TU12d* in the case of the multiplexing structure described with reference to FIG. 2 and where the containers to be processed are the containers VC31a, VC31b, VC22a through VC22f, VC11a through VC11e and VC12a through VC12d.

Columns ABCD . . . Q are the columns respectively assigned to these restructured multiplexing units. Columns 10 and 11 are respectively A and B columns assigned respectively to the restructured multiplexing units TU31a* and TU31b* and contain, for example, in lines 0 and 1 the indexing bytes H1VC31a*, H1VC31b*, H2VC31a* and H2VC31b* and in line 2 the justification bytes H3VC31a* and H3VC31b*. As the other restructured multiplexing units are of lower level in the hierarchy, columns 12 and 13 contain stuff bytes.

The organization into columns from column 14 through column 77 is as follows: ABCG ABDH ABEI ABFN ABCG ABDH ABEJ ABFO ABCG ABDH ABEK ABFP ABCG ABDH ABEL ABFQ. From column 78 through column 141 and then from column 142 through column 205 and finally from 206 through 269 this organization is repeated except that columns 89, 105, 121, 137 and then columns 153, 169, 185, 201 and finally 217, 233, 249, 265 are respectively M, I, J, K columns, then L, M, I, J columns and finally K, L, M, stuff columns instead of I, J, K, L columns like columns 25, 41, 57, 73, respectively.

In this example, the timing rate for extracting from the restructured frames the signals constituting the multiplexing units to be cross-connected is obtained from the restructured frame column resynchronization signal SC*, by inhibiting the latter in columns 0 through 9 of lines 0 through 8.

In the embodiment of the cross-connect signal memory write address generator shown in FIGS. 7 through 9 the signal obtained in this way is the clock signal CK used to clock the counters of this generator. The reset signal RZ of these counters is obtained from the restructured frame column synchronization signal SC* by inhibiting it everywhere except in column 10 and column 14 of lines 0 through 8.

As explained above in the description with reference to FIGS. 7 through 9, the counters of this write address generator then selected by the selector 14 belong to the set 4 of counters.

Note that in the case of a "US" multiplexing structure, in which the counters of this address generator then selected by the circuit 14 belong to the set 5 of counters, the clock signal CK used to clock these counters is obtained by inhibiting the restructured frame column synchronization signal in columns 0 through 11 of lines 0 through 8, the signals constituting the multiplexing units to be cross-connected being then stored in columns 12 through 269 of lines 0 through 8. The reset signal RAZ for these counters is then obtained from the restructured frame column synchronization signal by inhibiting it everywhere except in column 12 and in column 18 of lines 0 through 8.

There is claimed:

1. A multiplexing units, the multiplexing units being formed as appropriate either of multiplex signals obtained by multiplexing lower hierarchy level multiplexing units or signals from tributaries, said switching element being adapted to distribute according to a specific distribution law signals constituting multiplexing units, to be cross-connected, of incoming frames carried by a plurality of incoming transmission media in said switching element to outgoing frames carried by an outgoing transmission medium of said switching element which comprises, for each incoming frame transmission medium:
 - means for extracting from said incoming frames signals constituting multiplexing units to be cross-connected,
 - a memory for signals constituting multiplexing units to be cross-connected adapted to hold at least a predetermined number of signals said predetermined number denoting the repetition period in the incoming frames of the lowest bit rate tributary of the multiplexing hierarchy,
 - means for writing said memory synchronously with the extraction of said signals, at different addresses for signals constituting different multiplexing units to be cross-connected and at the same addresses for signals constituting the same multiplexing unit to be cross-connected, the frequency at which each address is rewritten being related to the repetition period in the incoming frames of the signals written at said address,
 - means for reading said memory synchronously with an insertion into the outgoing frames of signals constituting multiplexing units to be cross-connected at addresses determined by said distribution law.

2. Switching element according to claim 1 wherein said multiplexing hierarchy comprises a plurality of different multiplexing structures for different bit rates of the tributaries to be multiplexed, said hierarchy levels involved in multiplexing the incoming signals with a specific multiplexing factor and the respective periods of the signals to be written into the memory for signals constituting containers to be cross-connected are obtained by periodically reading an incoming frame description memory synchronous with said extraction, said incoming frame description memory being adapted to contain at least M words each of m bits where M is an integer designating the maximum value for all possible multiplexing structures of the product of the multiplexing factors of said structures except for those applying at hierarchy levels at which only signals derived from the tributaries can be multiplexed and where m is an integer designating the number of bits needed to code the maximum possible number of different periods of tributaries in the incoming frames.

3. Switching element according to claim 1 wherein the means for writing the memory for signals constituting containers to be cross-connected at different addresses for signals constituting different multiplexing units to be cross-connected comprise means for addressing said memory sequentially.

4. Switching element according to claim 1 wherein, in the case of incoming frames broken down into sections of the same length in which the multiplexing units to be cross-connected can occupy only predetermined locations at positions defined relative to the start of said sections and invariant for the same multiplexing unit, from one frame section to another and from one frame to another, a timing signal for extraction of the signals constituting multiplexing units to be cross-connected is derived from the signal for synchronizing locations of said frames by inhibiting the signal outside said predetermined locations.

5. Switching element according to claim 1 wherein the read addresses of the memory for signals constituting multiplexing units to be cross-connected are obtained by reading synchronously with said insertion timing a connection memory containing said distribution law in the form of a correspondence table linking said insertion timing and the addresses of the various memories for signals constituting multiplexing units to be cross-connected of said switching element, at different addresses for signals constituting separate multiplexing units to be cross-connected and at the same address for signals constituting the same multiplexing unit to be cross-connected, the frequency with which the connection memory addresses are reread being related to the repetition period of the signals constituting multiplexing units to be cross-connected to be inserted into the outgoing frames at the corresponding time and equal to the period of the signals to be read at the corresponding addresses from the memory for signals constituting multiplexing units to be cross-connected.

6. Switching element according to claim 5 wherein said multiplexing hierarchy comprises various possible multiplexing structures for the different bit rates of the tributaries to be multiplexed, said hierarchy levels each involved in multiplexing the incoming signals with a specific multiplexing factor and the repetition period of signals constituting multiplexing units to be cross-connected to be inserted in the outgoing frames are obtained by periodically reading an outgoing frame distribution memory synchronously with said insertion timing, said outgoing frame description memory being adapted to contain at least M words each of m bits where M is an integer designating the maximum value for all possible multiplexing structures of the product of the multiplexing factors of said structures except for those applying to hierarchy levels at which only signals derived from tributaries can be multiplexed and where m is an integer designating the number of bits needed to code the maximum possible number of different periods of tributaries in the outgoing frames.

7. Switching element according to claim 5 wherein said means for reading the connection memory at different addresses for signals constituting different multiplexing units to be cross-connected comprise means for addressing said memory sequentially.

8. Switching element according to claim 5 wherein, in the case of outgoing frames broken down into sections of the same length in which the multiplexing units to be cross-connected can occupy only predetermined locations at defined positions relative to the start of said sections and invariant for the same multiplexing unit from one frame section to another and from one frame to another, an extraction timing of signals constituting multiplexing units to be cross-connected is derived from the signal for synchronizing locations of frames by inhibiting the signal outside said predetermined locations.

* * * * *